United States Patent
Takatsuka et al.

(10) Patent No.: US 8,531,719 B2
(45) Date of Patent: Sep. 10, 2013

(54) IMAGE FORMING APPARATUS, IMAGE FORMING SYSTEM, STORAGE MEDIUM, AND CONTROL METHOD INCLUDING RECOMMENDATION INFORMATION WRITING

(75) Inventors: Kazuki Takatsuka, Osaka (JP); Takahiro Bito, Osaka (JP); Takeshi Kato, Osaka (JP); Toru Nishikawa, Osaka (JP); Junichi Saito, Osaka (JP); Hitoshi Nagahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 279 days.

(21) Appl. No.: 13/017,387

(22) Filed: Jan. 31, 2011

(65) Prior Publication Data

US 2011/0188083 A1  Aug. 4, 2011

(30) Foreign Application Priority Data

Feb. 4, 2010 (JP) ................... 2010-023227

(51) Int. Cl.
*G06K 15/00* (2006.01)
(52) U.S. Cl.
USPC ......... 358/1.16; 358/1.15; 711/103; 711/115; 711/154
(58) Field of Classification Search
USPC ................ 358/1.16, 1.15; 711/103, 115, 154
See application file for complete search history.

(56) References Cited

U.S. PATENT DOCUMENTS

| | | | |
|---|---|---|---|
| 2007/0264315 A1 | 11/2007 | Fournie et al. | |
| 2008/0055640 A1* | 3/2008 | Takahashi et al. | 358/1.16 |
| 2008/0159750 A1* | 7/2008 | Tokunaka et al. | 358/1.16 |
| 2009/0009976 A1 | 1/2009 | Nishikawa et al. | |
| 2009/0253286 A1 | 10/2009 | Tanaka et al. | |
| 2010/0088465 A1* | 4/2010 | Asano et al. | 711/103 |

FOREIGN PATENT DOCUMENTS

| | | |
|---|---|---|
| JP | 2006-221298 A | 8/2006 |
| JP | 2007-200178 A | 8/2007 |
| JP | 2008-000169 A | 1/2008 |
| JP | 2008-072283 A | 3/2008 |
| JP | 2009-536184 A | 10/2009 |
| WO | 2007/058031 A1 | 5/2007 |

* cited by examiner

*Primary Examiner* — Benny Q Tieu
*Assistant Examiner* — Juan M Guillermety
(74) *Attorney, Agent, or Firm* — Renner, Otto, Boisselle & Sklar, LLP

(57) ABSTRACT

An image forming apparatus of the present invention is an image forming apparatus into which a memory device is insertable and which performs a printing process on an image of image data stored in the memory device. The image forming apparatus includes a memory reading section for detecting insertion of the memory device into the image forming apparatus, and a display processing section for performing a notification process of warning of accidental ingestion of the memory device, when the memory reading section detects the insertion of the memory device. This makes it more surely possible to cause a user to give attention to accidental ingestion by young children.

6 Claims, 18 Drawing Sheets

FRONT SURFACE

EXTERNAL TERMINAL
BACK SURFACE

FRONT SURFACE

EXTERNAL TERMINAL
BACK SURFACE

FRONT SURFACE

BACK SURFACE

FRONT SURFACE 15.0mm 11.0mm

EXTERNAL TERMINAL
BACK SURFACE

USB MEMORY CAP

USB MEMORY MAIN BODY

IMAGE FORMING APPARATUS, IMAGE FORMING SYSTEM, STORAGE MEDIUM, AND CONTROL METHOD INCLUDING RECOMMENDATION INFORMATION WRITING

This Nonprovisional application claims priority under 35 U.S.C. §119(a) on Patent Application No. 2010-023227 filed in Japan on Feb. 4, 2010, the entire contents of which are hereby incorporated by reference.

TECHNICAL FIELD

The present invention relates to an image forming apparatus into which a memory device is insertable, such as a multifunction printer, a copying machine, a printer, a facsimile, and the like.

BACKGROUND ART

There are known memory cards using a nonvolatile semiconductor memory and USB (Universal Serial Bus) flash drives as data storage media used in electronics devices, such as a personal computer and a digital video camera. The memory cards and USB flash drives are handy because they are small and lightweight, and further, they are excellent in portability. In view of this, various types of electronics devices in which the memory cards and USB flash drives are usable are being developed. For example, image forming apparatuses having a slot for a memory card are commercially available, in these years. In such image forming apparatuses, image data to be printed can be inputted by use of a memory card, and update of firmware and installation of optional software can be performed by use of a memory card.

As such, memory devices, e.g., the memory cards and USB flash drives, are downsized and improved in portability, and can be widely used in various types of apparatus. However, the reduction in size of the memory devices involves a risk of a serious accident that a young child (infant or toddler) accidentally puts a memory device in his or her mouth.

Patent Literature 1 discloses a technique for notifying all around that a memory card is removed, when the removal of the memory card is detected, in order to prevent such accidental indigestion. However, the technique of Patent Literature 1 cannot prevent the accidental indigestion if there is no adult around.

Patent Literatures 2 to 4 disclose techniques for preventing accidental indigestion of a target product, in which techniques a substance that stimulates sense of taste of young children is applied to the target product so that young children do not put it into their mouths by mistake. For example, Patent Literature 2 discloses a semiconductor memory that is covered with a housing having a roughened surface region in which a bittering agent is retained. Further, Patent Literature 3 discloses a small storage medium containing an innocuous emetic substance (denatonium benzoate, epicatechin, humulone). Furthermore, Patent Literature 4 discloses a simulated beverage for toy, containing cyclodextrin.

CITATION LIST

Patent Literature 1
Japanese Patent Application Publication, Tokukai, No. 2008-72283 A (Publication Date: Mar. 27, 2008)
Patent Literature 2
Japanese Patent Application Publication, Tokukai, No. 2007-200178 A (Publication Date: Aug. 9, 2007)
Patent Literature 3
International Publication, WO 2007/058031 (Publication Date: May 24, 2007)
Patent Literature 4
Japanese Patent Application Publication, Tokukai, No. 2008-169 A (Publication Date: Jan. 10, 2008)

SUMMARY OF INVENTION

Technical Problem

However, all users do not necessarily know that there are such memory devices as disclosed Patent Literatures 2 and 3 which contain a substance that stimulate sense of taste of young children. Further, even if a user knows such a memory device, he or she may sometimes use a memory device with less attention given to accidental ingestion by young children. This still may cause such a problem that, although a user has a child, the user uses a memory device that does not contain a substance stimulating sense of taste of young children, and the child accidentally ingests the memory device.

The present invention is accomplished in view of the above problem. An object of the present invention is to provide an image forming apparatus that is capable of more surely warning a user of accidental ingestion by young children.

Solution to Problem

In order to achieve the above object, an image forming apparatus of the present invention is an image forming apparatus into which a memory device is insertable and which performs a printing process on an image of image data stored in the memory device, and the image forming apparatus of the present invention includes: a detection section for detecting insertion of the memory device into the image forming apparatus; and a notification section for performing a notification process of warning of accidental ingestion of the memory device, when the detection section detects the insertion of the memory device.

Advantageous Effects of Invention

An image forming apparatus of the present invention includes a detection section for detecting insertion of a memory device into the image forming apparatus; and a notification section for performing a notification process of warning of accidental ingestion of the memory device, when the detection section detects the insertion of the memory device. With the above arrangement, a user can be notified of a possibility that accidental ingestion of the memory device by young children may happen, so that the user can give attention to the accidental ingestion. As a result, it is possible to prevent the accidental ingestion.

BRIEF DESCRIPTION OF DRAWINGS

FIG. 19 illustrates a notification message posted on a newspaper or the like.

DESCRIPTION OF EMBODIMENTS

Embodiment 1

Internal Arrangement of Image Forming Apparatus

Figure 1:
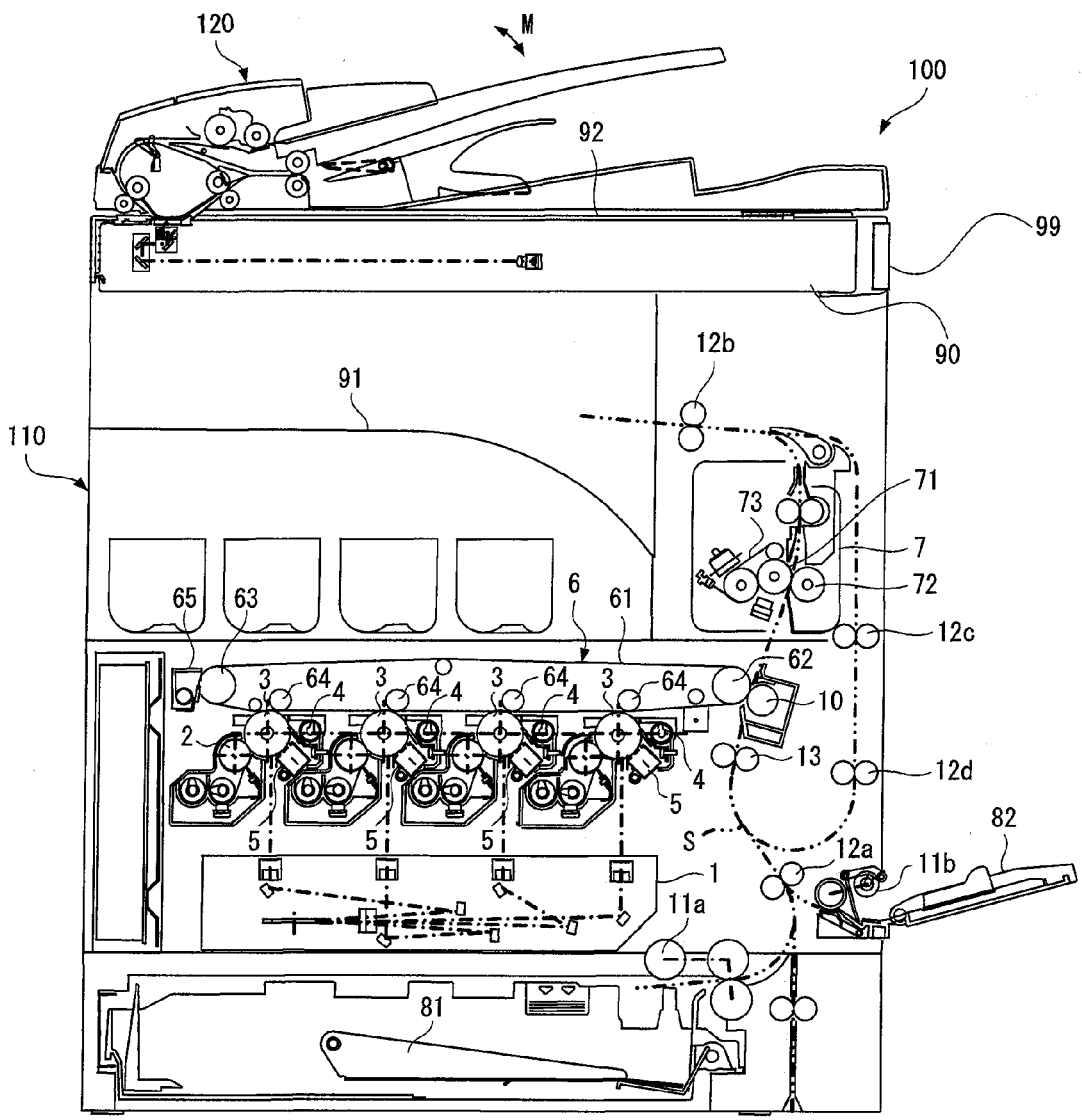
FIG. 1 is a schematic view illustrating an internal arrangement of an image forming apparatus according to one embodiment of the present invention.

The following describes one embodiment of the present invention. FIG. 1 is a schematic view illustrating an internal arrangement of an image forming apparatus according to one embodiment of the present invention.

An image forming apparatus 100 is a multifunction printer which has a scanner function and a printer function and which forms a multicolor or monochroic image on a predetermined sheet (sheet of paper for recording) in accordance with image data transmitted from an outside. The image forming apparatus 100 includes an apparatus main body 110 and an automatic document processing device 120 (see FIG. 1).

The apparatus main body 110 includes an exposure unit 1, developing devices 2, photoreceptor drums 3, cleaning units 4, charging devices 5, an intermediate transfer belt unit 6, a fixing unit 7, a paper-feeding cassette 81, a paper output tray 91, and so on.

On an upper section of the apparatus main body 110 is provided a scanner section 90 including a transparent glass 92, which serves as a scanner platen. On an upper side of the scanner section 90 is attached the automatic document processing device 120. The automatic document processing device 120 automatically carries a document onto the transparent glass 92. Further, the automatic document processing device 120 is designed so as to freely rotate toward a direction of an arrow M. By the rotation of the automatic document processing device 120 toward the direction of the arrow M, the transparent glass 92 is opened, so that a document can be placed on the transparent glass 92 by hand.

Further, as illustrated in FIG. 1, the scanner section 90 is provided with a memory reading section (detection section) 99 into which a memory card is insertable. Moreover, the image forming apparatus 100 according to the present embodiment can perform a printing process based on image data read from a memory card inserted in the memory reading section 99. The memory reading section 99 checks whether or not a memory card is inserted into the memory reading section 99, analyzes what content is stored in the memory card, and transfers image data read out from the memory card. When detecting the insertion of a memory card into the memory reading section 99, the memory reading section 99 sends, to the after-mentioned main control section, an insertion detection signal indicative of the insertion.

Image data dealt with in the image forming apparatus 100 corresponds to a color image using colors of black (K), cyan (C), magenta (M), and yellow (Y). In view of this, in order that four types of latent images corresponding to the respective colors are formed, the image forming apparatus 100 includes four image forming stations each including a developing device 2, a photoreceptor drum 3, a charging device 5, and a cleaning unit 4. That is, the image forming apparatus 100 are provided with an image forming station for black image, an image forming station for cyan image, an image forming station for magenta image, and an image forming station for yellow image.

The present invention deals with a case where four colors, black (K), cyan (C), magenta (M), and yellow (Y), are used. However, for example, a 6-color combination in which light cyan (LC) (which has the same hue as cyan and is lighter than cyan) and light magenta (LM) (which has the same hue as magenta and is lighter than magenta) are used in combination with the above four colors may be also usable.

The charging device 5 is a device for uniformly charging a surface of the photoreceptor drum 3 at a given potential. In the present embodiment, a non-contact-type charging device is used as the charting device 5. However, a contact-type charging device such as a roller-type or brush-type charging device may be also usable.

The exposure unit 1 is a laser scanning unit (LSU) provided with a laser emission section (laser light source), polygon mirrors for scanning laser beams, and optical members (a lens and a reflective mirror) for guiding laser beams scanned by the polygon mirrors, to respective photoreceptor drums 3. It is also possible to use, as the exposure unit, an EL or LED writing head in which light emitting elements are provided in an array.

The exposure unit 1 has such a function of exposing the charged photoreceptor drums 3 according to inputted image data, to form electrostatic latent images of the inputted image data on respective surfaces of the photoreceptor drums 3. Each of the developing devices 2 develops a corresponding electrostatic latent image formed on a corresponding photoreceptor drum 3, with toner in the developing device 2. Note that a developing device 2 in the image forming station for black image carries out development with black toner; a developing device 2 in the image forming station for cyan image carries out development with cyan toner; a developing device 2 in the image forming station for yellow image carries out development with yellow toner; and a developing device 2 in the image forming station for magenta image carries out development with magenta toner.

The intermediate transfer belt unit 6 provided above the photoreceptor drums 3 is provided with an intermediate transfer belt 61, an intermediate transfer belt driving roller 62, an intermediate transfer belt driven roller 63, intermediate transfer rollers 64, and an intermediate transfer belt cleaning unit 65. Note that four intermediate transfer rollers 64 are provided for the respective colors (YMCK).

The intermediate transfer belt driving roller 62, the intermediate transfer belt driven roller 63, and the intermediate transfer roller 64 suspend the intermediate transfer belt 61 so that the intermediate transfer belt 61 is driven to rotate. Further, a transfer bias is applied to each of the intermediate transfer rollers 64 so as to transfer a toner image of a corresponding photoreceptor drum 3 on the intermediate transfer belt 61.

The intermediate transfer belt 61 is provided so as to make contact with a respective of the photoreceptor drums 3. Toner images of respective colors formed on the respective photoreceptor drums 3 are sequentially transferred onto the intermediate transfer belt 61 so that the toner images of the respective colors overlap each other. In this way, a color toner image (multicolor toner image) is formed on the intermediate transfer belt 61. The intermediate transfer belt 61 is made of a polyimide film having a thickness of, for example, 100 μm to 150 μm, in an endless form. The intermediate transfer belt 61 is not limited to the above arrangement, and may be arranged such that an elastic layer is provided on a polyimide film.

Transfer of the toner images from the respective photoreceptor drums 3 to the intermediate transfer belt 61 is performed by the respective intermediate transfer roller 64 that make contact with a reverse side of the intermediate transfer belt 61. To each of the intermediate transfer rollers 64 is applied a high-voltage transfer bias (high voltage having a polarity (+) opposite to a charging polarity (−) of toner), so as to transfer the toner image. The intermediate transfer rollers 64 are rollers having a metal (e.g., stainless) axis having a diameter of 8 mm to 10 mm as a base. Surfaces of the rollers are each covered with an electrically conductive elastic material (e.g., EPDM, foamable urethane, or the like). With the use of the electrically conductive elastic material, it is possible to uniformly apply a high voltage to the intermediate transfer belt 61. In the present embodiment, a transfer electrode is formed in a roller shape, but may be formed in a brush shape.

As describe above, the toner images of the respective colors developed on the respective photoreceptor drums 3 are superimposed on one another on the intermediate transfer belt 61. The toner images thus superimposed are carried, by rotation of the intermediate transfer belt 61, to a contact position (second transfer position) where the transfer roller 10 has contact with the intermediate transfer belt 61. Then, the toner images thus carried up to the contact position are transferred onto a sheet by the transfer roller 10 at the contact position.

The transfer roller 10 is pressed by a given nip toward the intermediate transfer belt 61, and a voltage (high voltage having a polarity (+) opposite to a charging polarity (−) of toner) for transferring toner onto a sheet is applied thereto. Further, in order to make the given nip steady, one of the transfer roller 10 and the intermediate transfer belt driving roller 62 is made of a hard material (metal), and the other one is made of a soft material such as an elastic roller (elastic rubber roller or foamable resin roller).

Further, residual toner, which is not transferred onto the sheet by the transfer roller 10 and remains on the intermediate transfer belt 61, may cause mixing of toner colors in a subsequent step. In view of this, the image forming apparatus 100 is set to remove and collect the residual toner by the intermediate transfer belt cleaning unit 65. The intermediate transfer belt cleaning unit 65 is provided with a cleaning blade as a cleaning member that makes contact with the intermediate transfer belt 61. In the intermediate transfer belt 61, a portion that has contact with the cleaning blade is supported, from its reverse side, by the intermediate transfer belt driven roller 63.

The paper-feeding cassette 81 is a tray in which to store up sheets (sheets of paper for recording) used for image formation, and is provided below the exposure unit 1 in the apparatus main body 110. It is also possible to store up sheets used for image formation, in a manual-paper-feeding cassette 82. The paper output tray 91 provided on an upper side of the apparatus main body 110 is a tray in which to pile up sheets on which printing is performed, in a face-down manner.

Further, the apparatus main body 110 is provided with a sheet carrying path S in a substantially vertical form, through which sheets from the paper-feeding cassette 81 and the manual-paper-feeding cassette 82 are carried to the paper output tray 91 via the transfer roller 10 and the fixing unit 7. In vicinity to the sheet carrying path S from the paper-feeding cassette 81 or the manual-paper-feeding cassette 82 up to the paper output tray 91, pickup rollers 11a and 11b, a plurality of carrying rollers 12a to 12d, a resist roller 13, the transfer roller 10, the fixing unit 7 are provided.

The plurality of carrying rollers 12a to 12d are small rollers that facilitate and assist the carrying of a sheet, and provided along the sheet carrying path S. The pickup roller 11a is attached proximate to an end portion of the paper-feeding cassette 81, and picks up sheets one by one from the paper-feeding cassette 81 so as to feed the sheets to the sheet carrying path S. The pickup roller 11b is attached proximate to an end portion of the manual-paper-feeding cassette 82, and picks up sheets one by one from the manual-paper-feeding cassette 82 so as to feed the sheets to the sheet carrying path S. Further, the resist roller 13 temporarily retains a sheet carried through the sheet carrying path S. The resist roller 13 has a function of supplying the sheet to the second transfer position (contact position where the transfer roller 10 has contact with the intermediate transfer belt 61) at a timing when an anterior end of a toner image formed on the intermediate transfer belt 61 and an anterior end of the sheet overlap each other.

The fixing unit 7 is provided with a heat roller 71 and a pressure roller 72. The heat roller 71 and the pressure roller 72 rotate with a sheet sandwiched therebetween. Further, the heat roller 71 is controlled by a control section (not shown) to maintain a given fixing temperature based on a signal from a temperature sensor (not shown). The heat roller 71 and the pressure roller 72 have a function of thermally pressing toner on a sheet so that multiple color toner images transferred on the sheet are fused, mixed, and pressed against the sheet, thereby thermally fixing the multiple color toner images on the sheet. The fixing unit 7 is also provided with an external fixing belt 73 for externally fixing the heat roller 71.

The following describes details of how a sheet is carried at a time of one-side printing. As described above, the image forming apparatus 100 is provided with the paper-feeding cassette 81 and the manual-paper-feeding cassette 82, in each of which to store up sheets in advance. The pickup rollers 11a and 11b are respectively provided for the paper-feeding cassettes 81 and 82 to feed a sheet such that the pickup rollers 11a and 11b guide sheets one by one to the sheet carrying path S. A sheet carried from each of the paper-feeding cassettes 81 and 82 is then carried to the resist roller 13 by the carrying rollers 12a provided on the sheet carrying path S. The sheet is then carried to the second transfer position (contact position where the transfer roller 10 has contact with the intermediate transfer belt 61) at a timing when an anterior end of the sheet and an anterior end of a toner image formed on the intermediate transfer belt 61 overlap each other. At the second transfer position, the toner image is transferred from the intermediate transfer belt 61 onto the sheet. After that, the sheet passes through the fixing unit 7, whereby unfixed toner on the sheet is fused and fixed by heat. The sheet subjected to a fixing process is outputted to the paper output tray 91 by the carrying rollers 12b, which follows the fixing unit 7 and is provided on a downstream side of the sheet carrying path S.

Two-side printing is carried out such that: when the one-side printing is completed in the above manner and a posterior end of the sheet passing through the fixing unit 7 is gripped by the carrying rollers 12b, the carrying rollers 12b counterrotate so as to guide the sheet toward the carrying rollers 12c and 12d. The sheet is carried by the carrying rollers 12c and 12d to the resist roller 13, and printing is performed on a backside of the sheet. Thereafter, the sheet is outputted to the paper output tray 91.

(Hardware Configuration of Image Forming Apparatus)

Figure 2:
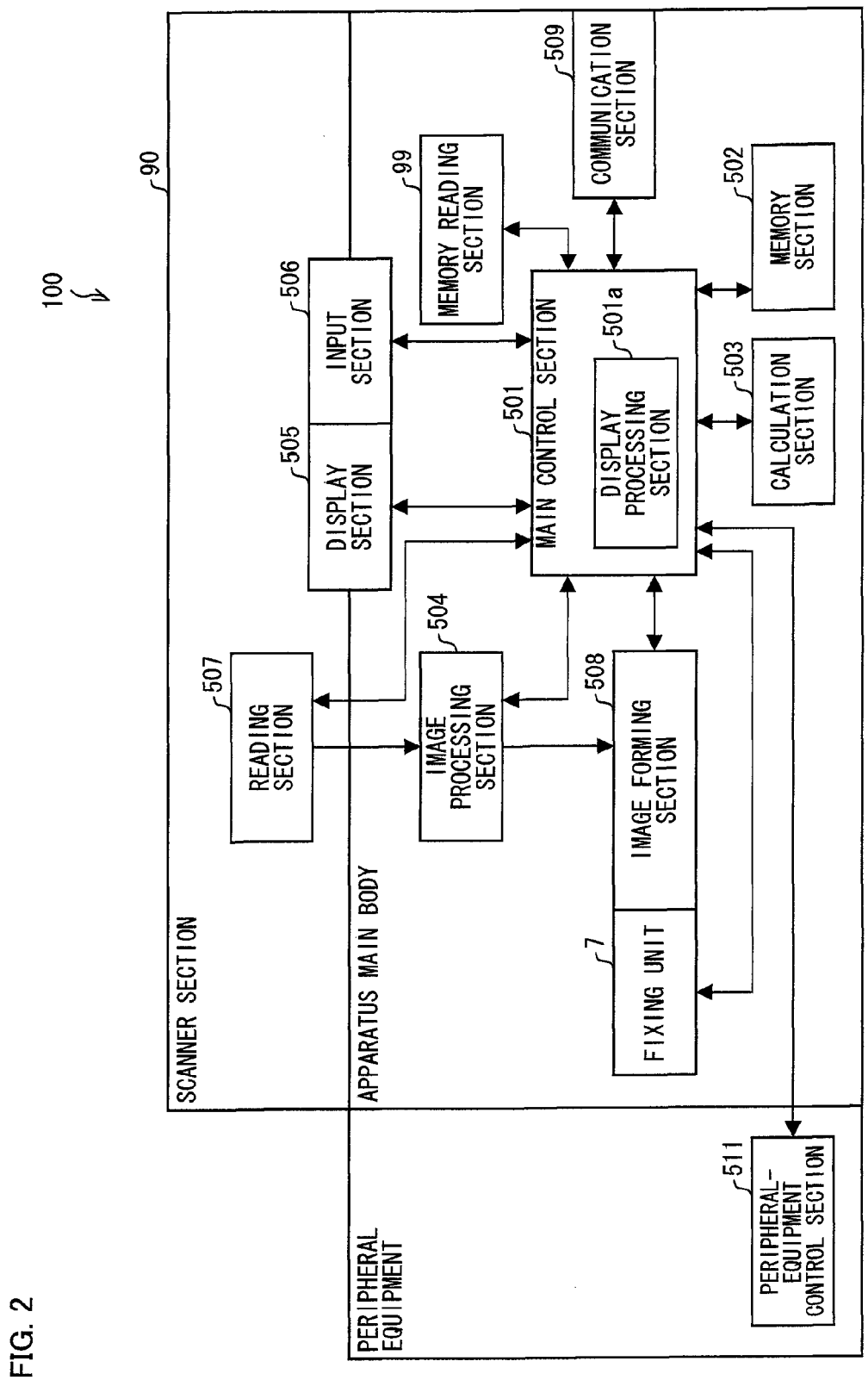
FIG. 2 is a block diagram schematically illustrating an arrangement of an image forming apparatus according to Embodiment 1.

The following describes details of hardware of the image forming apparatus 100. FIG. 2 is a block diagram schematically illustrating an arrangement of the image forming apparatus 100 of the present embodiment. The image forming apparatus 100, as illustrated in FIG. 2, includes a main control section 501, a memory section 502, a calculation section 503, an image processing section 504, a display section 505, an input section 506, a reading section 507, an image forming section 508, a communication section 509, and a peripheral-equipment control section 511.

The display section 505 is a block corresponding to a display device provided in an operation panel. The display section 505 displays various information related to the image forming apparatus 100 and a preview of an image to be printed. The input section 506 is a block corresponding to operation buttons provided on the operation panel, which is arranged on a top surface of the image forming apparatus 100. The input section 506 receives, from a user, various commands and various information. Further, in a case where the display device is configured to serve as a touch panel, the touch panel also functions as the input section 506.

The reading section 507 is an image sensor provided in the scanner section 90. The reading section 507 reads an image of a document and produces an analogue image signal. The image processing section 504 is a circuit which converts the image signal to digital image data, and performs various image processing on the image data.

The image forming section 508 is a block for forming a toner image on a sheet based on the image data processed by the image processing section 504. A combination of the exposure unit 1, the developing devices 2, the photoreceptor drums 3, the cleaning units 4, the charging devices 5, and the intermediate transfer belt unit 6 corresponds to the image forming section 508.

The communication section 509 communicates with an external device. The external device may be an electric/electronics device which can form or obtain image data and which is electrically connectable to the image forming apparatus 100. Examples of the external device encompass a digital camera, a computer connected to the image forming apparatus 100 via a network, and the like. For example, the communication section 509 receives from a computer apparatus a printing instruction including image data.

The memory section 502 is a section in which to store various commands and setting values inputted from the input section 506 or the display section 505, detection results by various sensors provided in the image forming apparatus 100, image data read from a memory card inserted in the memory reading section 99, image data or firmware inputted from an external device, various setting values and data tables for controlling operations of devices provided in the image forming apparatus 100, programs for executing various controls, and the like. As the memory section 502, a memory generally used in this field can be used. For example, a read-only memory (ROM), a random access memory (RAM), a hard disk drive (HDD), and the like can be used.

The calculation section 503 reads out various information and programs for various controls from the memory section 502, and performs a calculation process and a determination process. Based on various determination results and calculation results obtained by the calculation section 503, the main control section 501 sends control signals to respective devices provided in the image forming apparatus 100, so as to control the respective devices. Note that the main control section 501 and the calculation section 503 are process circuits realized by, for example, a micro computer, a micro processor, or the like including a central processor (CPU: Central Processing Unit). Further, the image forming apparatus 100 is provided with a main power supply (not shown) for supplying electric power to these devices provided therein. The peripheral-equipment control section 511 is a control circuit that outputs a control signal for controlling peripheral equipment such as a finisher and a sorter, which are post-processing devices.

The main control section 501 includes a display processing section 501a for causing the display section 505 to display a predetermined notification window. More specifically, when the memory reading section 99 detects insertion of a memory card, the display processing section 501a performs a process of causing the display section 505 to display a notification window that warns of accidental ingestion of the memory card by young children (infants and toddlers).

(Arrangement of Memory Card)

Next will be described details of an arrangement of a memory card insertable into the memory reading section 99 of the image forming apparatus 100. In the present embodiment, a memory card insertable into the memory reading section 99 may be a small and portable memory card that is widely used.

Note that a memory card on which a treatment for preventing accidental ingestion is performed, e.g., a memory card containing a substance that stimulates sense of taste of young children is preferred from the viewpoint of preventing accidental ingestion of the memory card by young children. In the following description, a memory device (a memory card, a USB flash drive, or the like) on which a treatment for preventing accidental ingestion is performed is called "recommendable memory device".

Figure 3:
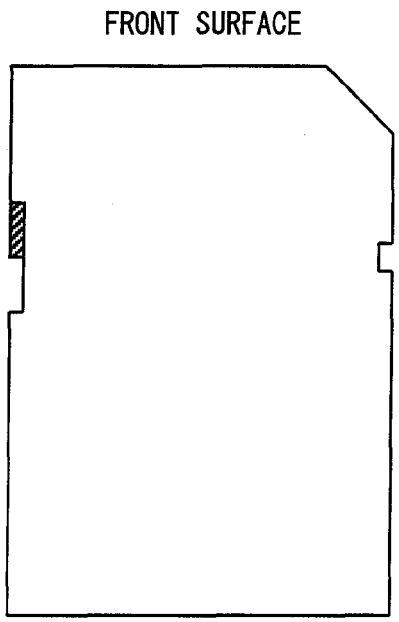
FIG. 3(a) is a schematic view illustrating a front surface of an SD memory card that is insertable in an image forming apparatus.
FIG. 3(b) is a schematic view illustrating a back surface of the SD memory card.
Figure 3:
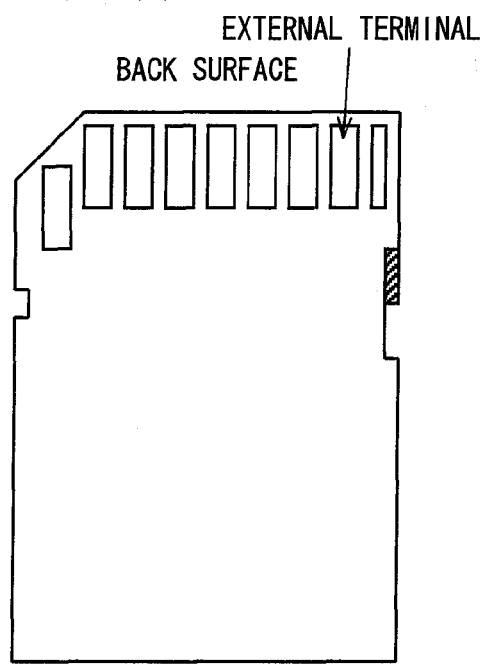

FIG. 3(a) is a schematic view illustrating a front surface of a recommendable memory device (SD memory card) of the present embodiment. FIG. 3(b) is a schematic view illustrating a back surface of the recommendable memory device of FIG. 3(a).

The recommendable memory device of the present embodiment is arranged such that a substance that stimulates sense of taste of young children is applied to an outer surface of the recommendable memory device, excluding a region where external terminals are provided. The substance may be, for example, the bittering agent disclosed in Patent Literature 2, the emetic substance (denatonium benzoate, epicatechin, humulone, or the like) disclosed in Patent Literature 3, a vegetable oil (cyclodextrin, e.g., Japanese horseradish, mustard, red pepper, ginger, black pepper, or the like) harmless to humans, or the like.

Instead of the substance that stimulates sense of taste of young children, paste kaolin may be applied to the memory card. For the memory card to which kaolin is applied, in a case where a young child accidentally puts the memory card into his or her mouth, the kaolin (kaolinite) absorbs saliva to exhibit a sucking function. Due to the sucking function, an outer surface of the memory card sticks to a tongue of the young child. This accordingly retrains that the young child accidentally swallows the memory card.

In order to effectively retain the paste kaolin on the outer surface of the memory card, it is preferable to form microscopic projections/recesses in a kaolin-applied area of an outermost base material of the memory card. Further, the projections/recesses are formed preferably in an unpatterned, mesh, or honeycomb geometry. Further, it is preferable that the projections/recesses be 10 μm to 500 μm high. If the projections/recesses have a height of less than 10 μm, kaolin is easily removed. On the other hand, if the height of the projections/recesses is more than 500 μm, a large amount of kaolin is required, which significantly increases a production cost of a memory card. The paste kaolin can be produced according to a well-known production method, as typified by a production method disclosed in Japanese Translation of PCT International Publication, Tokuhyo, No. 2009-536184.

Instead of the paste kaolin, kaolin particles may be blasted on a resin constituting a housing of a memory card, by a blast process. That is, with the use of a commercially available siphon-blasting machine, kaolin particles are blasted on a shaped resin (thermosetting resin or thermoplastic resin), which is formed into a housing of a memory card, thereby producing a resin containing kaolin particles. In a case where the resin containing kaolin particles is used as a housing of a memory card, a sufficient thickness of a kaolin-containing layer is at most 1 μm to 20 μm.

(Process Subsequent to Insertion of Memory Card)

Figure 4:
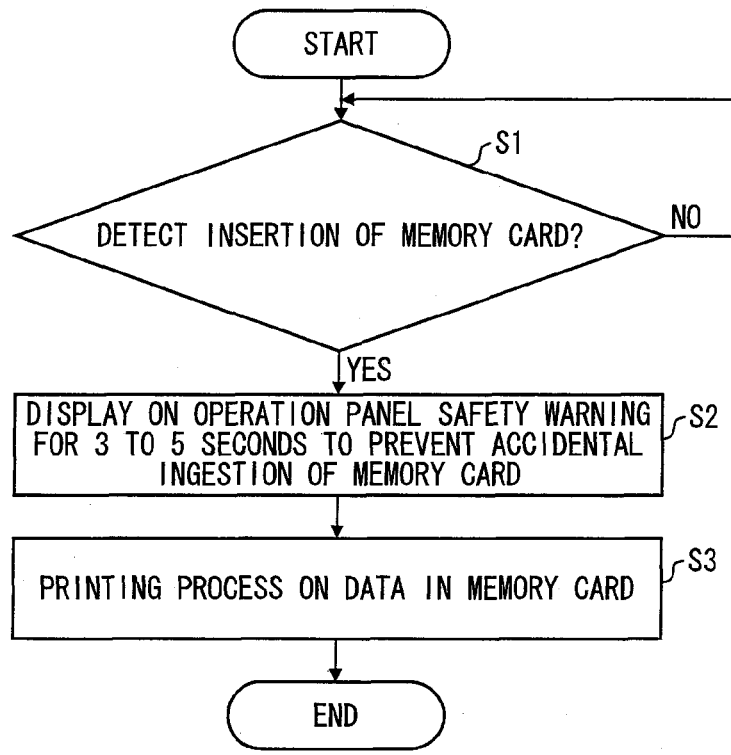
FIG. 4 is a flowchart illustrating a flow of a process performed when a memory card is inserted into an image forming apparatus.

The following describes a distinguishing process, according to the present embodiment, which is performed when a memory card is inserted into the memory reading section 99. FIG. 4 is a flowchart illustrating a flow of a process performed when a memory card is inserted into the memory reading section 99.

Initially, the main control section 501 determines whether or not a memory card is inserted into the memory reading section 99 (S1). As described above, when a memory card is inserted, the memory reading section 99 sends, to the main control section 501, an insertion detection signal indicative of the insertion of the memory card. Accordingly, the main control section 501 receives the insertion detection signal from the memory reading section 99, whereby the main control section 501 can determine that a memory card is inserted in the memory reading section 99.

When the main control section 501 receives the insertion detection signal from the memory reading section 99, the display processing section 501a controls the display section 505 to display a notification window that warns of accidental ingestion of the memory card by young children (S2). More specifically, the display processing section 501a reads out window data indicative of the notification window from the memory section 502, and controls the display section 505 to display the notification window.

Figure 5:
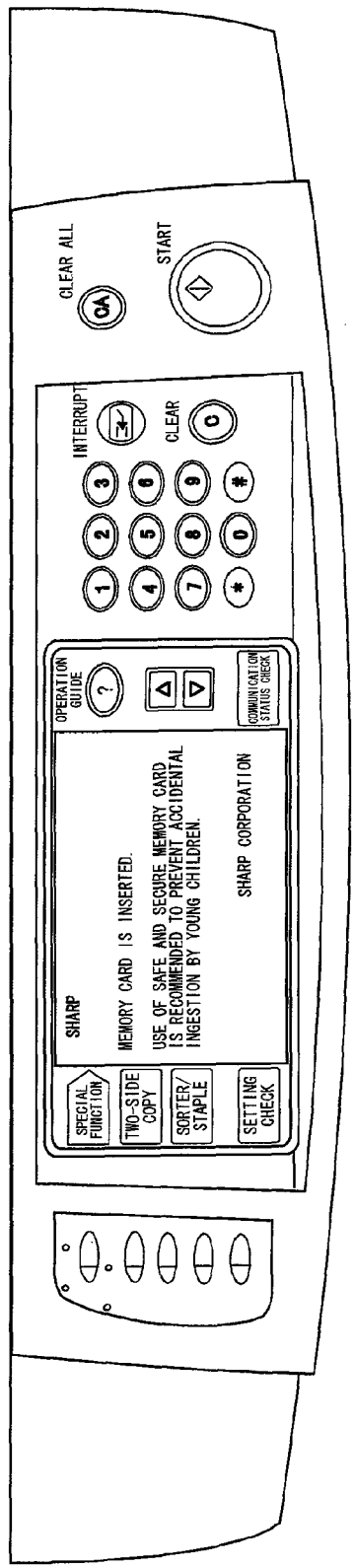
FIG. 5(a) illustrates an entire operation panel at a time when a memory card is inserted into an image forming apparatus.
FIG. 5(b) is an enlarged view of a window illustrated in FIG. 5(a).
Figure 5:
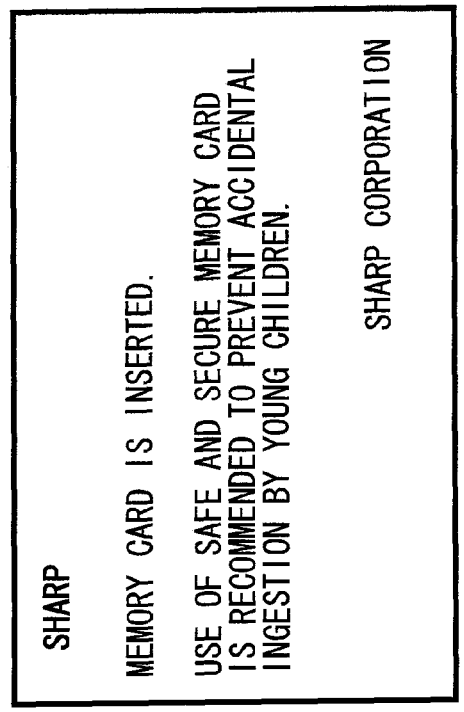

Each of FIG. 5(a) and FIG. 5(b) illustrates one example of the notification window. FIG. 5(a) illustrates an entire operation panel. FIG. 5(b) is an enlarged view of a window displayed on the display section 505. As illustrated in FIG. 5(a) and FIG. 5(b), the display processing section 501a displays a notification window that encourages use of a recommendable memory device. This notifies a user of a possibility that accidental ingestion by young children may happen. Further, even if the user does not know the existence of recommendable memory devices, the user can be notified of the existence of recommendable memory devices. The above arrangement accordingly can encourage such a user having a child to use a recommendable memory device, thereby resulting in that accidental ingestion by the child can be prevented.

The display processing section 501a displays the notification window for a predetermined period of time (for 3 to 5 seconds, for example). In a case where the notification window is displayed for less than 3 seconds, the user may possibly overlook the notification window. In this case, the user cannot be warned sufficiently. On the other hand, in a case where the notification window is displayed for more than 5 seconds, it takes time for the notification window to disappear. This is inconvenient for a user who wants to start printing immediately.

Subsequently, the main control section 501 controls the display section 505 to display an operation window via which a printing instruction to print image data stored in the memory card is to be received. For example, the main control section 501 controls the display section 505 to display a window which displays thumbnail images of image data read out from the memory card by the memory reading section 99 and urges a user to enter an instruction on which image is to be printed.

The main control section 501 then sends image data of a target image to be printed, to the image processing section in accordance with the instruction entered from the input section 506, and controls the image processing section to convert the image data into data in a processible format for the image forming section. The image forming section then performs a printing process on the image data on which the image processing is performed by the image processing section (S3). As such, the user can perform a printing process on image data stored in a memory card, by inserting the memory card in the image forming apparatus 100.

Modified Example 1

The above description dealt with a case where an SD (Secure Digital) memory card (see FIG. 3) is taken as an example of the memory card to be inserted into the memory reading section 99. However, the memory device to be inserted into the memory reading section 99 is not limited to the SD memory card.

Figure 6:
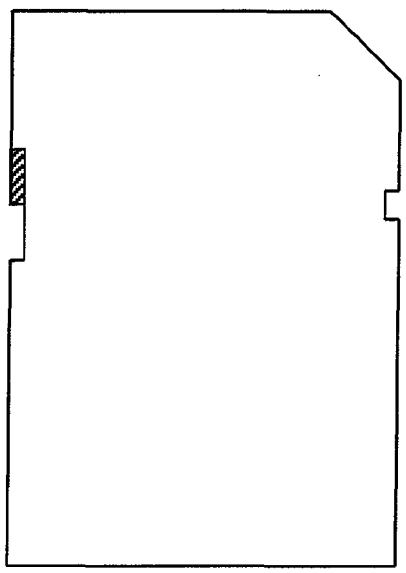
FIG. 6(a) is a schematic view illustrating a front surface of an SDHC memory card that is insertable into an image forming apparatus.
FIG. 6(b) is a schematic view illustrating a back surface of the SDHC memory card.
Figure 6:
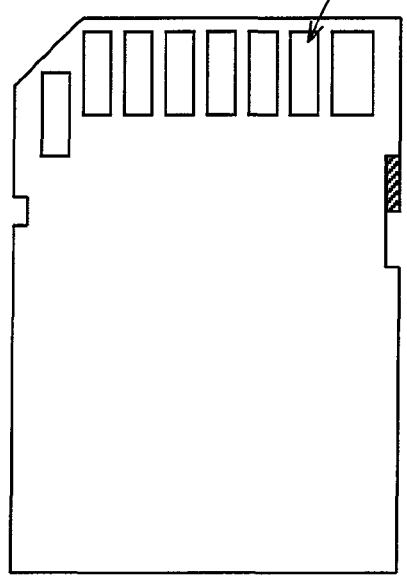
Figure 7:
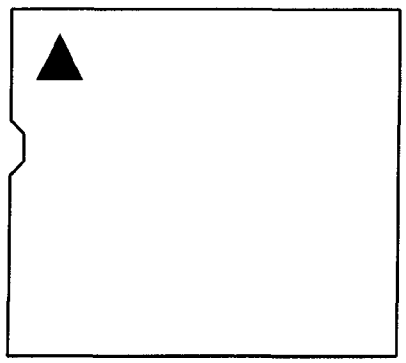
FIG. 7(a) is a schematic view illustrating a front surface of a CompactFlash (Registered Trademark) memory that is insertable into an image forming apparatus.
FIG. 7(b) is a schematic view illustrating a back surface of the CompactFlash (Registered Trademark) memory.
Figure 7:
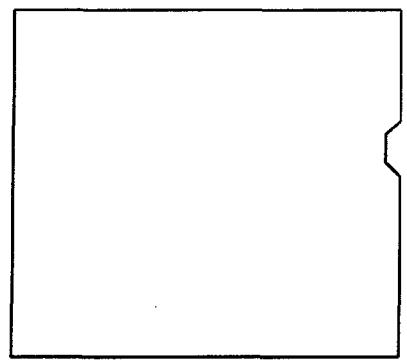
Figure 8:
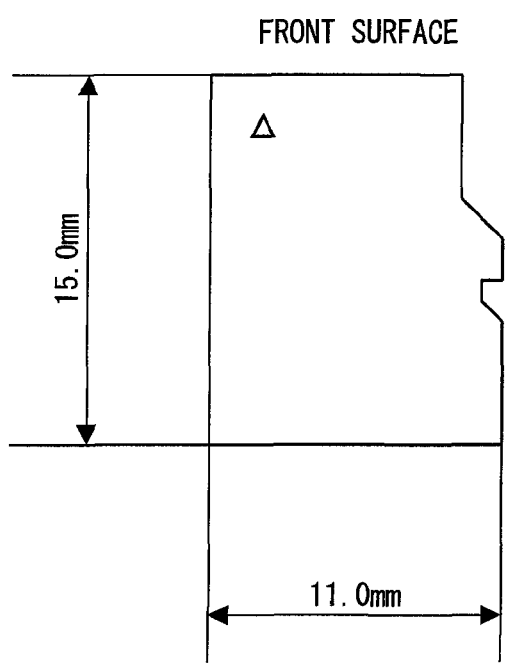
FIG. 8(a) is a schematic view illustrating a front surface of a micro SDHC memory card that is insertable into an image forming apparatus.
FIG. 8(b) is a schematic view illustrating a back surface of the micro SDHC memory card.
Figure 8:
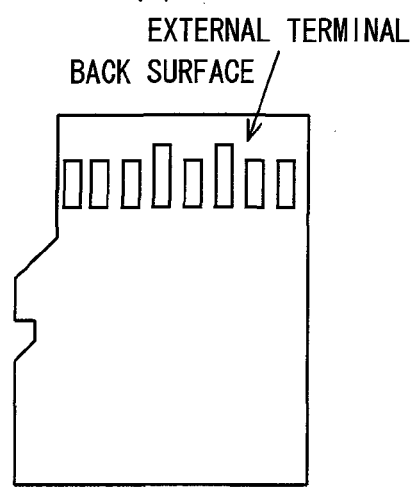
Figure 9:
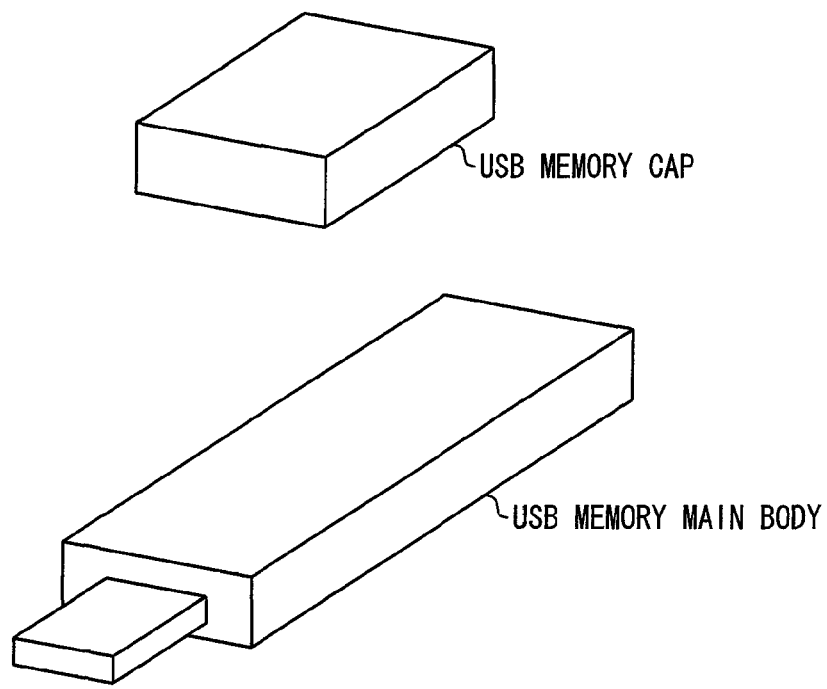
FIG. 9 is a schematic view illustrating a USB flash drive that is insertable into an image forming apparatus.

The memory device may be, for example, an SDHC memory card (see FIG. 6), a CompactFlash (Registered Trademark) memory card (see FIG. 7), a micro SDHC memory card (see FIG. 8), and a USB flash drive (see FIG. 9). In order to prevent accidental ingestion by young children, a memory device that contains kaolin or a substance (a taste stimulation substance such as a bittering agent, an emetic substance, and a vegetable oil) that stimulates sense of taste of young children is used as a recommendable memory device. For the SDHC memory cards as illustrated in FIG. 6 or FIG. 8, a recommendable memory device is an SDHC memory card whose outer surface, excluding a region where external terminals are provided, a taste stimulation substance or kaolin is applied to. Further, for the CompactFlash (Registered Trademark) memory card as illustrated in FIG. 7, a recommendable memory device is a memory card provided with a housing whose outer surface (both a front surface and a back surface) a taste stimulation substance or kaolin is applied to. Moreover, for the USB flash drive as illustrated in FIG. 9, a recommendable memory device is a USB flash drive provided with a housing and a cap whose outer surfaces a taste stimulation substance or kaolin is applied to.

The memory reading section 99 includes a slot into which at least one of the SD memory card, the SDHC memory card, the micro SDHC memory card, the CompactFlash (Registered Trademark) memory card, and the USB flash drive is insertable. Alternatively, the memory reading section 99 may include a plurality of slots for these several types of memory devices to be insertable thereto.

Modified Example 2

In the above description, when a memory card is inserted in the memory reading section 99, the display section 505 is caused to display a notification window that warns of accidental ingestion of a memory card by young children. However, the display section 505 may display the notification window not only at the timing when a memory card is inserted in the memory reading section 99, but at other timings.

Figure 10:
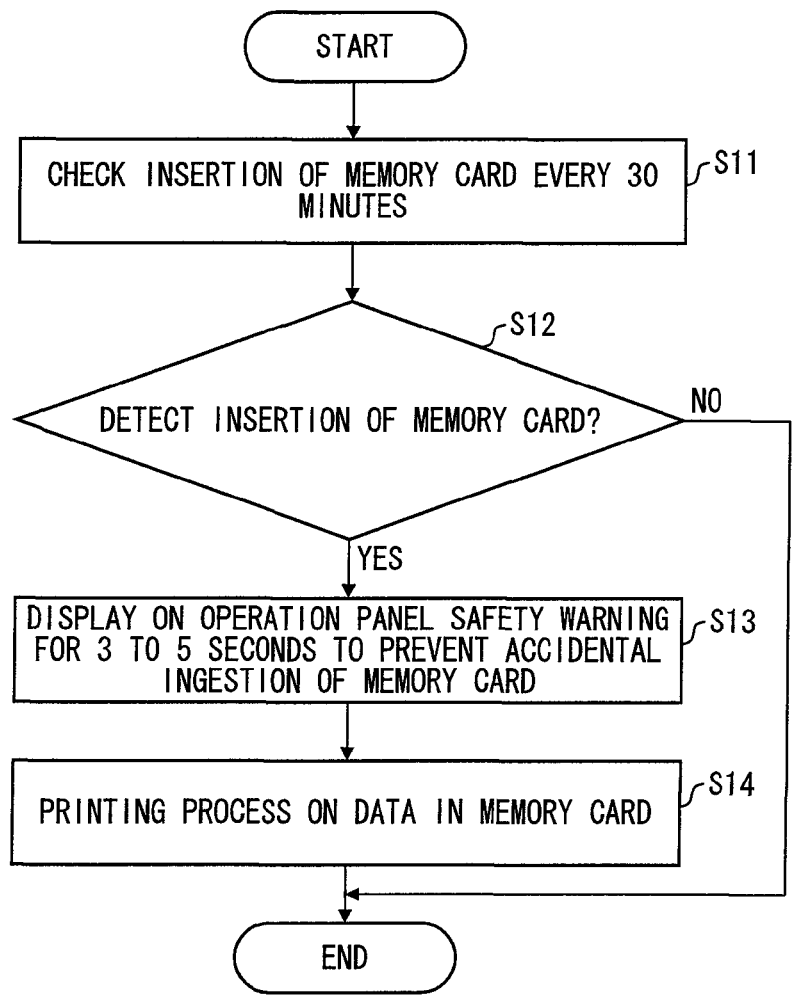
FIG. 10 is a flowchart illustrating another process flow of how to display a notification window that warns of accidental ingestion.

For example, there may be presumably a case where a user forgets to take out a memory card from the memory reading section 99, and a young child takes out the memory card and accidentally ingests the memory card, for example. In view of this, such an arrangement may be also possible that it is checked at regular intervals whether or not a memory card is inserted in the memory reading section 99, and if a memory card remains in the memory reading section 99, the notification window may be displayed. A process flow in this case will be described below with reference to the flowchart of FIG. 10.

Initially, the main control section 501 instructs the memory reading section 99 to check whether or not a memory card is inserted therein, at predetermined intervals (for example, 30 minutes) (S11).

In response to the instruction from the main control section 501, the memory reading section 99 checks whether or not a memory card is inserted therein (S12). In a case where a memory card is inserted (Yes in S12), the memory reading section 99 sends an insertion detection signal to the main control section 501.

When the main control section 501 receives the insertion detection signal, the display processing section 501a controls the display section 505 to display a notification window that warns of accidental ingestion of the memory card by young children, for a predetermined period of time (for example, 3 to 5 seconds) (S13), in a similar manner to S2 in FIG. 4.

After that, the main control section 501 controls the display section 505 to display an operation window, via which a printing instruction to print image data stored in the memory card is entered, and the main control section 501 performs a process in accordance with an entered instruction (S14). In a case where the user forgets to take out the memory card, the user may enter an instruction not to perform printing.

In the arrangement, even in a case where a user forgets to take out a memory card, a notification window is displayed at regular intervals to warn the user. This reminds the user that he or she forgets to take out the memory card. As a result, it is possible to prevent accidental ingestion by young children.

Figure 11:
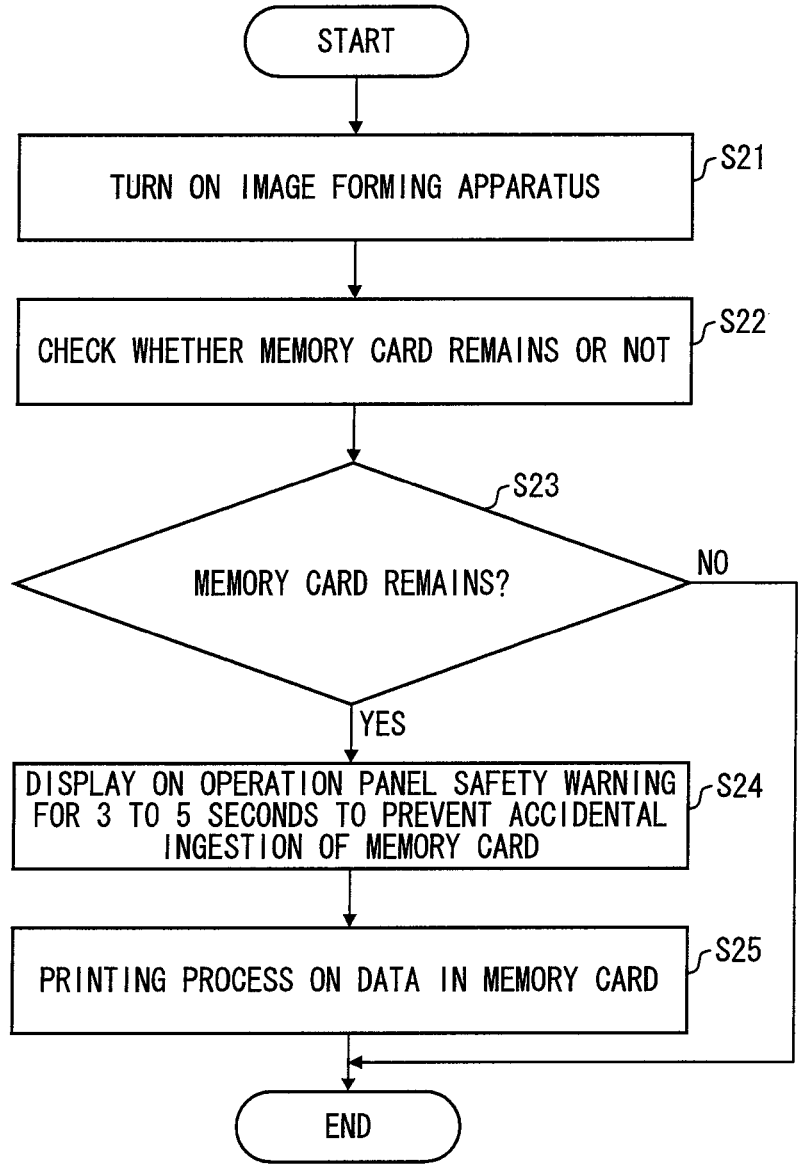
FIG. 11 is a flowchart illustrating another process flow of how to display a notification window that warns of accidental ingestion.

Further, there are some cases where the user turns off the image forming apparatus 100 with a memory card inserted therein. In view of this, the image forming apparatus 100 may be arranged such that when the image forming apparatus 100 is turned on, the image forming apparatus 100 checks whether or not a memory card is inserted therein, and if a memory card is inserted, the image forming apparatus 100 displays the notification window. A process flow in this case will be described below with reference to the flowchart of FIG. 11.

When the image forming apparatus 100 is turned on and activated (S21), the main control section 501 instructs the memory reading section 99 to check whether or not a memory card is inserted.

In response to the instruction from the main control section 501, the memory reading section 99 checks whether or not a memory card is inserted therein (S22). In a case where a memory card is inserted, the memory reading section 99 sends an insertion detection signal to the main control section 501. Subsequent steps S24 and 25 are the same as the steps S2 and S3 in FIG. 4 or the steps S13 and S14 in FIG. 10, and therefore are not explained here. In a case where the user just forgets to take out the memory card, the user may enter an instruction not to perform printing, in S25.

In the arrangement, a notification window that warns the user is displayed at a timing when the image forming apparatus 100 is turned on. With the arrangement, even in a case where the user forgets to take out a memory card, the user is reminded that he or she forgets to take out the memory card. As a result, it is possible to prevent accidental ingestion by young children.

Modified Example 3

The image forming apparatus 100 may be communicably connected to a computer apparatus so that a printing process can be performed on image data received from the computer apparatus. In particular, in a case where the image forming apparatus 100 is used, for example, at home, in a relatively small office, a kindergarten, a nursery school, or an educational facility (for example, a prep school) for young children, in various events, or the like, only a single computer apparatus can be communicably connected to the image forming apparatus 100. In such a case, a user can select, depending on the situation, between the following usage patterns: (a) a printing instruction is entered from the computer apparatus with respect to the image forming apparatus 100; and (b) a memory card is inserted in the memory reading section 99 of the image forming apparatus 100 so that printing is performed without using the computer apparatus.

In view of this, the timing to display a notification window that warns of accidental ingestion of a memory card by young children is not limited to the timing when a memory card is inserted in the image forming apparatus 100. The notification window may be also displayed on a computer apparatus at a timing when a printer driver for the image forming apparatus 100 is installed in the computer apparatus. The timing when the printer driver is installed in the computer apparatus is a timing when the user purchases the image forming apparatus 100. This makes it possible to notify a user of a warning about accidental ingestion of a memory card by young children, as soon as possible. The present modified example is explained below.

Figure 12:
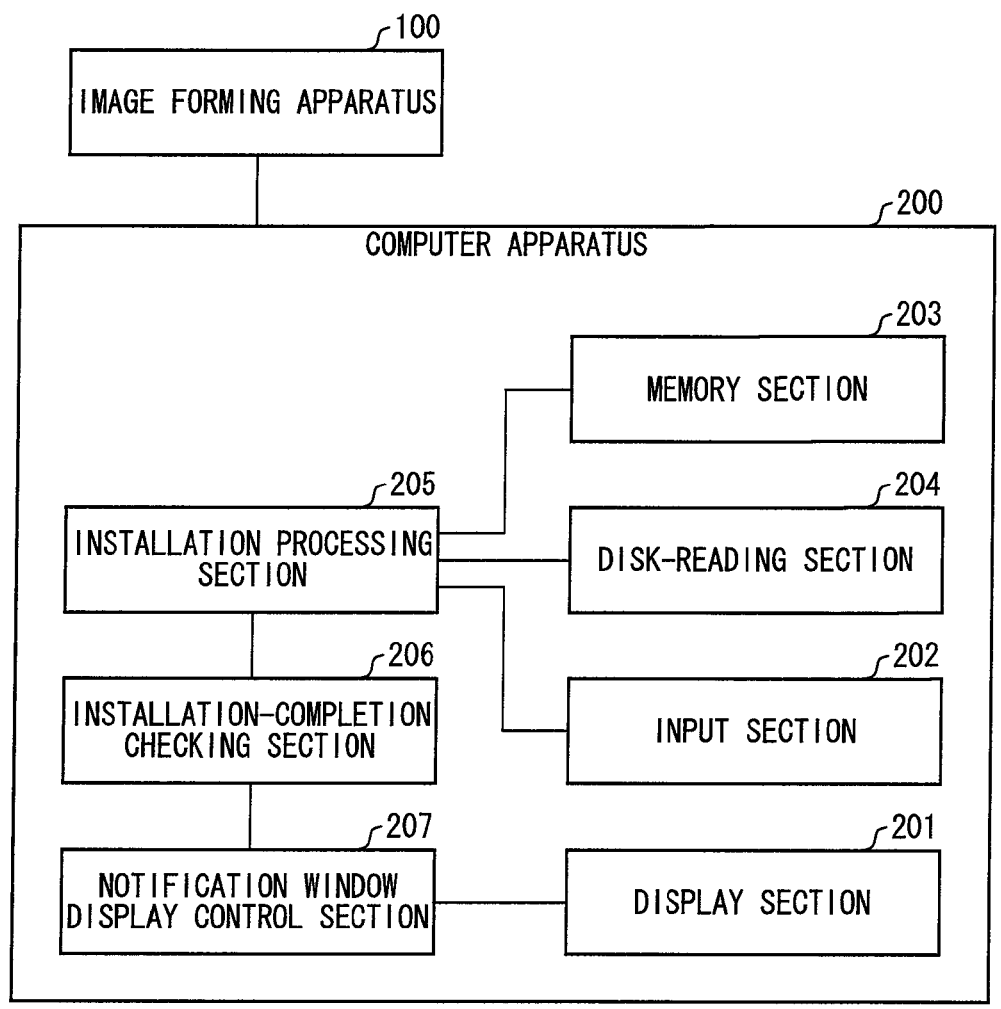
FIG. 12 illustrates an arrangement of a computer apparatus that is communicably connected to an image forming apparatus.

FIG. 12 illustrates an arrangement of a computer apparatus 200 that is communicably connected to the image forming apparatus 100.

As illustrated in FIG. 12, the computer apparatus 200 includes a display section (display device) 201, an input section 202, a memory section 203, a disk-reading section 204, an installation processing section 205, an installation-completion checking section 206, and a notification window display control section (display control section) 207.

The display section 201 is a section for notifying a user of information, and may be, for example, a liquid crystal display or an organic EL display. The input section 202 is a section via which a user enters information, and is constituted by, for example, a mouse and a keyboard. The memory section 203 is a section in which to store various programs and data.

The disk-reading section 204 is a section for reading various data and programs from an optical disk, such as a CD-ROM, a DVD-ROM, or a Blu-ray disk.

The installation processing section 205 is a section for executing a process of installing in the memory section 203 a program read by the disk-reading section 204 and a program obtained via a communications network. More specifically, when an optical disk in which a printer driver for operating the image forming apparatus 100 is stored is loaded in the disk-reading section 204, the installation processing section 205 executes a process of installing the printer driver read out from the optical disk, into the memory section 203.

The installation-completion checking section 206 checks whether or not the installation processing section 205 completes the installation of the printer driver for the image forming apparatus 100. For example, the installation-completion checking section 206 may determine that the installation is completed, upon detecting displaying of a completion window on the display section 201, which completion window indicates that the installation processing section 205 completed the installation of the printer driver. When the installation-completion checking section 206 determines that the installation of the printer driver is completed, the installation-completion checking section 206 sends an installation-completion notification to the notification window display control section 207.

Upon receiving the installation-completion notification, the notification window display control section 207 performs a process of controlling the display section 201 to display a notification window that warns of accidental ingestion of a memory card by young children.

The installation-completion checking section 206 and the notification window display control section 207 are blocks that are caused to operate when a CPU as hardware executes programs for the operations stored in the memory section 203. The programs for causing the installation-completion checking section 206 and the notification window display control section 207 to operate are appended to the printer driver for the image forming apparatus 100. That is, the programs for causing the installation-completion checking section 206 and the notification window display control section 207 to operate, and the printer driver for the image forming apparatus 100 are stored in the same optical disk. When the optical disk is loaded in the disk-reading section 204, the disk-reading section 204 initially reads out the programs for causing the installation-completion checking section 206 and the notification window display control section 207 to operate. Then, the programs are installed by the installation processing section 205 into the memory section 203. Accordingly, the execution of the programs by the CPU (not shown) causes the installation-completion checking section 206 and the notification window display control section 207 to operate.

Figure 13:
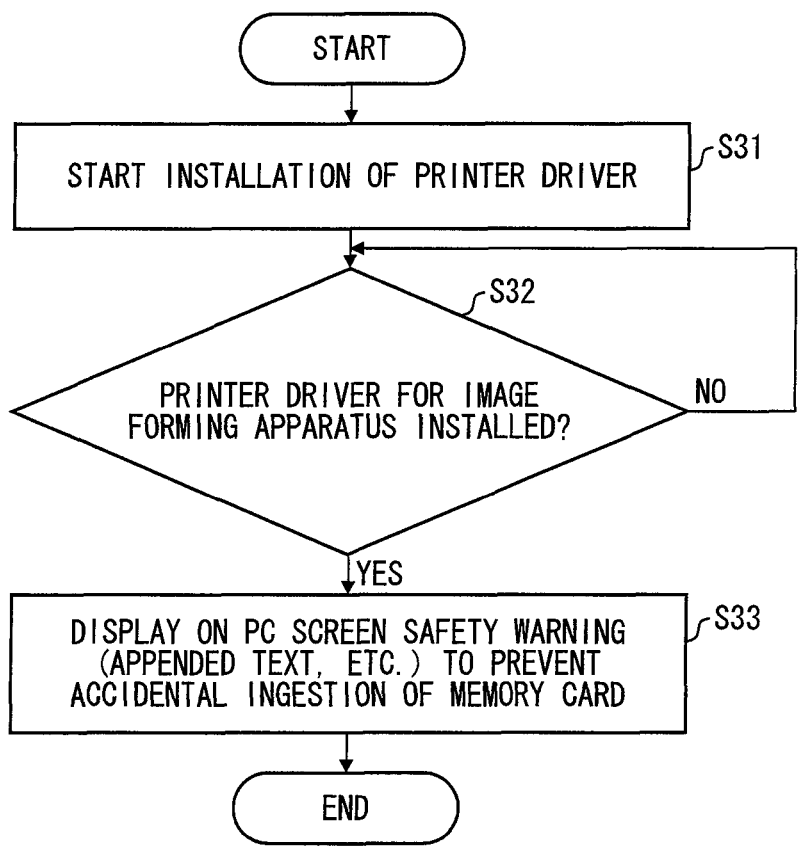
FIG. 13 is a flowchart illustrating a process flow of how a printer driver is installed.

With reference to FIG. 13, the following describes a process flow of how the printer driver is installed in the computer apparatus 200 of the present modified example. FIG. 13 is a flowchart illustrating a flow of this process.

Initially, when an optical disk in which a printer driver for the image forming apparatus 100 is loaded in the disk-reading section 204, the installation processing section 205 installs the printer driver read out by the disk-reading section 204, into the memory section 203 (S31).

Based on whether an installation-completion window indicating that the installation processing section 205 completes the installation is displayed or not, the installation-completion checking section 206 determines whether or not the printer driver for the image forming apparatus 100 has been installed (S32). When the installation-completion checking section 206 detects the completion of the installation (Yes in S32), the installation-completion checking section 206 sends an installation-completion notification to the notification window display control section 207.

Figure 14:
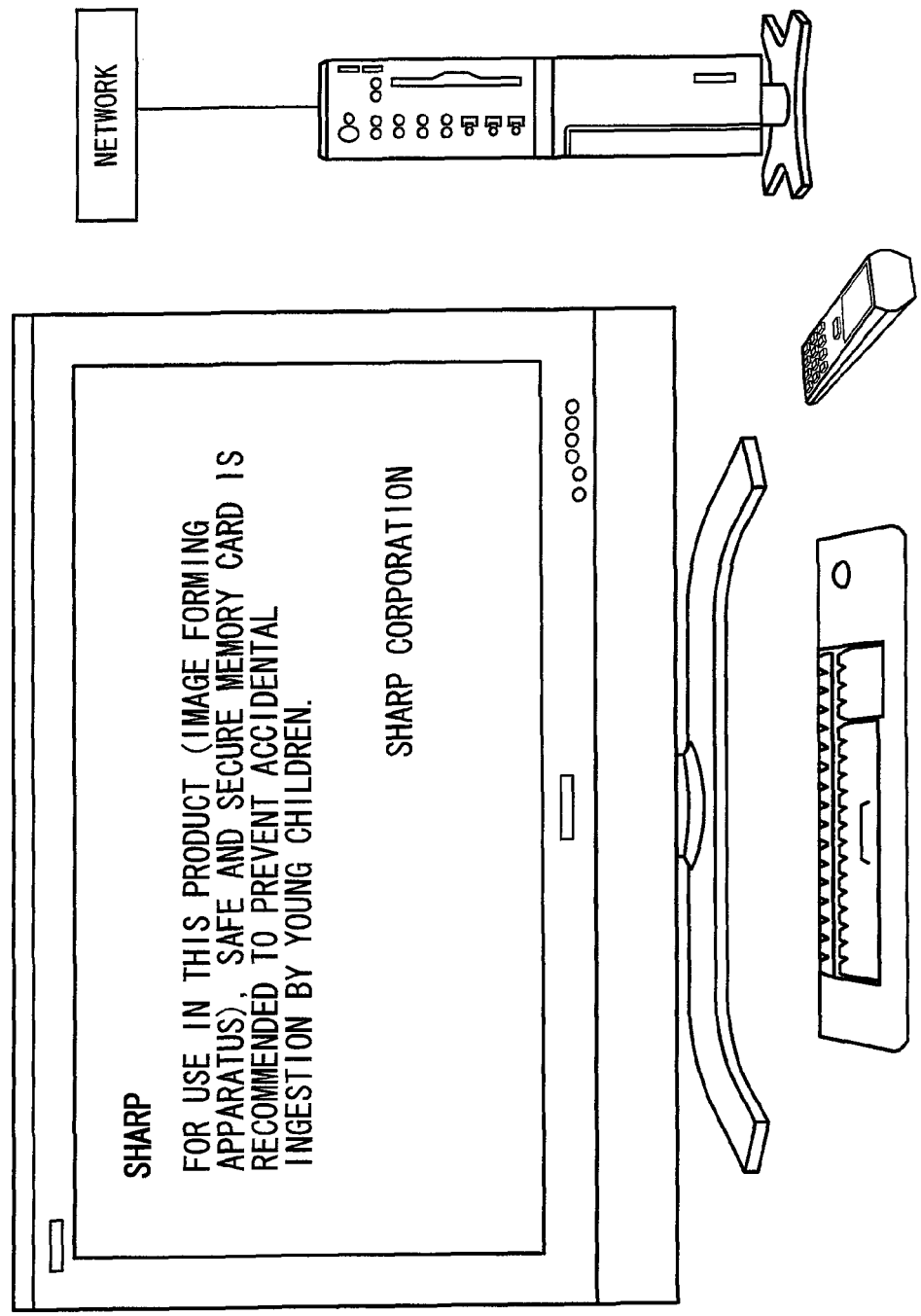
FIG. 14 illustrates one example of a notification window displayed when a printer driver is installed.

Upon receiving the installation-completion notification, the notification window display control section 207 performs a process of controlling the display section 201 to display a notification window that warns of accidental ingestion of a memory card by young children (S33). FIG. 14 illustrates one example of the notification window. As illustrated in FIG. 14, the notification window display control section 207 controls the display section 201 to display a window that warns of accidental ingestion of a memory card by young children, as precautions for use of the image forming apparatus 100.

As such, the control method for controlling the computer apparatus 200 in the present modified example includes: the installation-completion checking step (S32) of checking whether the installation of the printer driver is completed or not; and the display control step (S33) of controlling the display section 201 to display the notification window that warns of accidental ingestion of a memory card, when the completion of the installation is detected.

In accordance with the control method, it is possible for a user to give attention to accidental ingestion of a memory card by young children, before the user uses the image forming apparatus 100.

Modified Example 4

In the above embodiment, when a memory card is inserted in the image forming apparatus 100, a notification window that warns of accidental ingestion of the memory card by young children is displayed on the image forming apparatus 100. In addition to that, such an arrangement is also possible that when a memory card is inserted in the image forming apparatus 100, the notification window may be also displayed on a computer apparatus that is communicably connected to the image forming apparatus 100. With this arrangement, it is possible to further draw user's attention to accidental ingestion of the memory card by young children.

Figure 15:
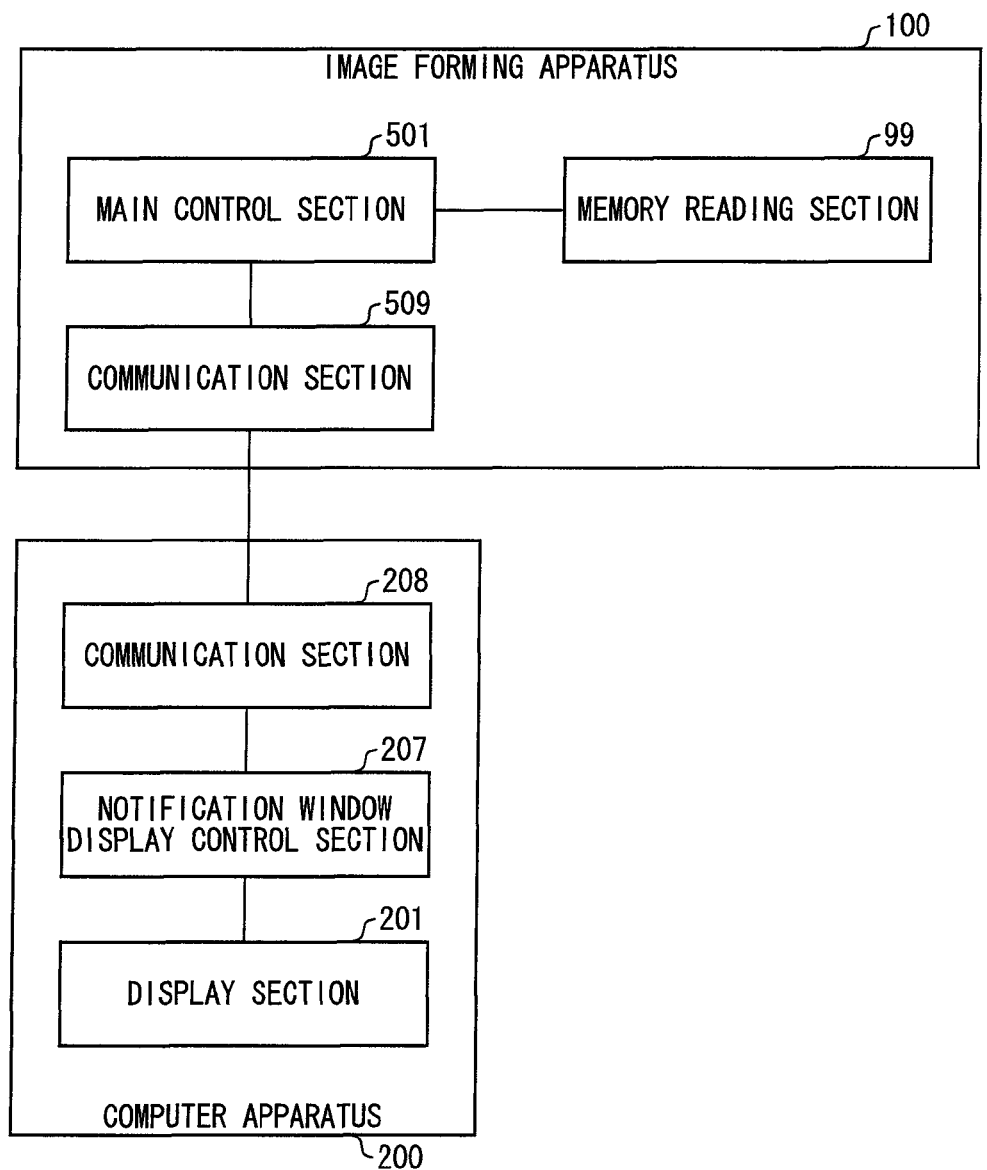
FIG. 15 illustrates another arrangement of a computer apparatus that is communicably connected to an image forming apparatus.

FIG. 15 is a block diagram illustrating an arrangement of the present modified example. As illustrated in FIG. 15, the image forming apparatus 100 is communicably connected to a computer apparatus (information processing apparatus) 200. The present modified example assumes that the image forming apparatus 100 is used at home or in a relatively small office, and the image forming apparatus 100 is communicably connected to only a single computer apparatus 200.

In the present modified example, when the main control section 501 of the image forming apparatus 100 receives an apparatus detection signal from the memory reading section 99, the main control section 501 forwards the apparatus detection signal to the computer apparatus 200 via a communication section.

In the meantime, as illustrated in FIG. 15, the computer apparatus 200 includes a communication section, a display section 201, and a notification window display control section 207.

The communication section is a section for establishing communication with the image forming apparatus 100. For example, the communication section establishes communication with the image forming apparatus 100 by use of LAN cable, wireless LAN, Bluetooth (Registered Trademark).

When the communication section receives the apparatus detection signal from the image forming apparatus 100, the notification window display control section 207 controls the display section 201 to display a notification window that warns of accidental ingestion of the memory card by young children.

Figure 16:
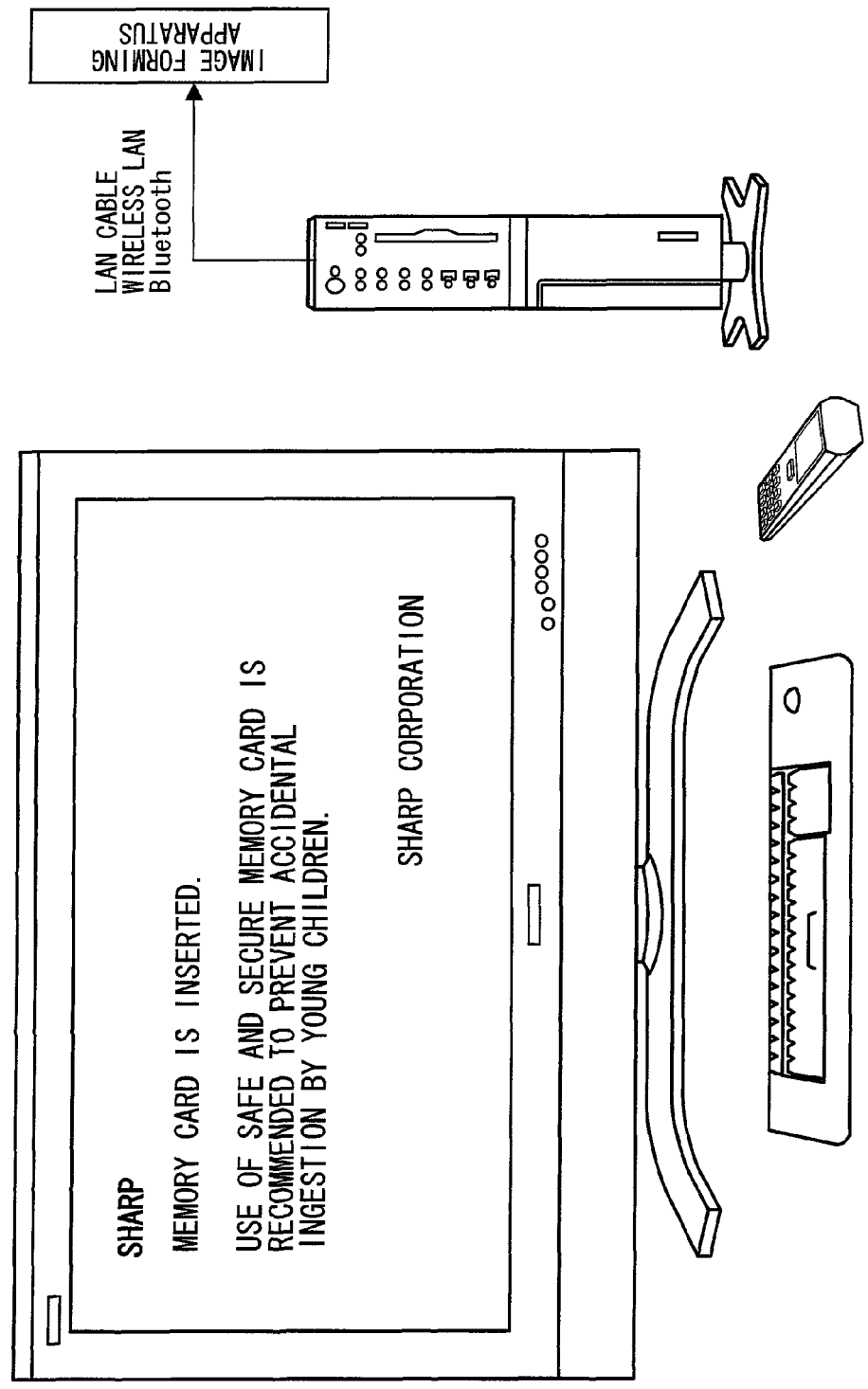
FIG. 16 illustrates one example of a notification window displayed on a computer apparatus when a memory card is inserted into an image forming apparatus.

FIG. 16 illustrates one example of the notification window displayed by the notification window display control section 207. Thanks to the notification window, a user is notified of a possibility that accidental ingestion by young children may happen. Further, even if the user does not know the existence of recommendable memory devices, the user can be notified of the existence of recommendable memory devices. The above arrangement can encourage such a user having a child to use a recommendable memory device, thereby resulting in that accidental ingestion by the child can be prevented.

(Others)

In the above description, the notification window that warns of accidental ingestion of a memory card by young children is displayed on the display section 505. However, instead of displaying the notification window on the display section 505, a notification voice that warns of accidental ingestion of a memory card by young children may be played back via a speaker. Even in this case, it is also possible to give warning to a user. Such an arrangement is naturally possible that the notification voice may be played back through a speaker while the notification window is displayed on the display section 505.

Figure 17:
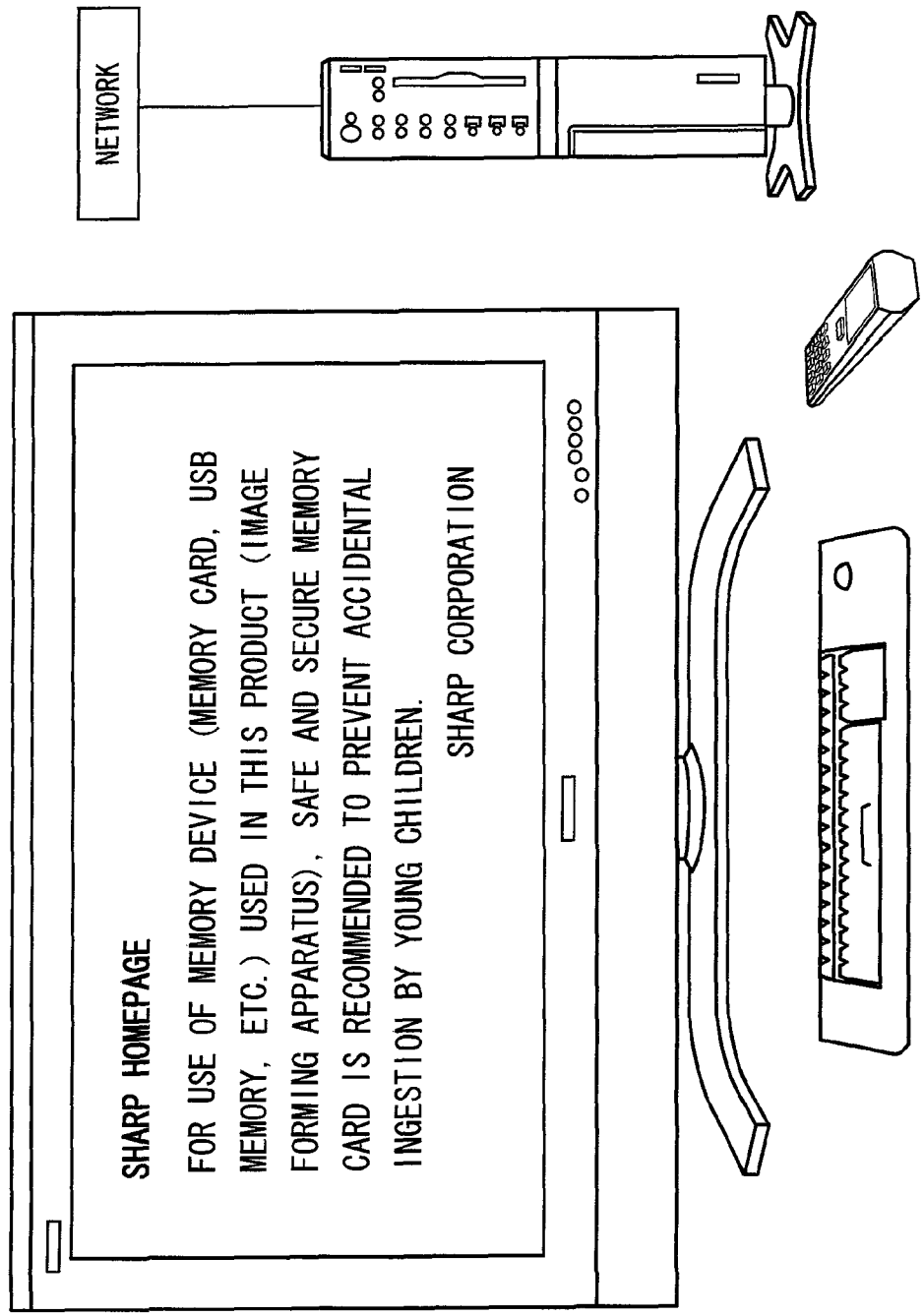
FIG. 17 illustrates a display example of a notification window on a Web page.
Figure 18:
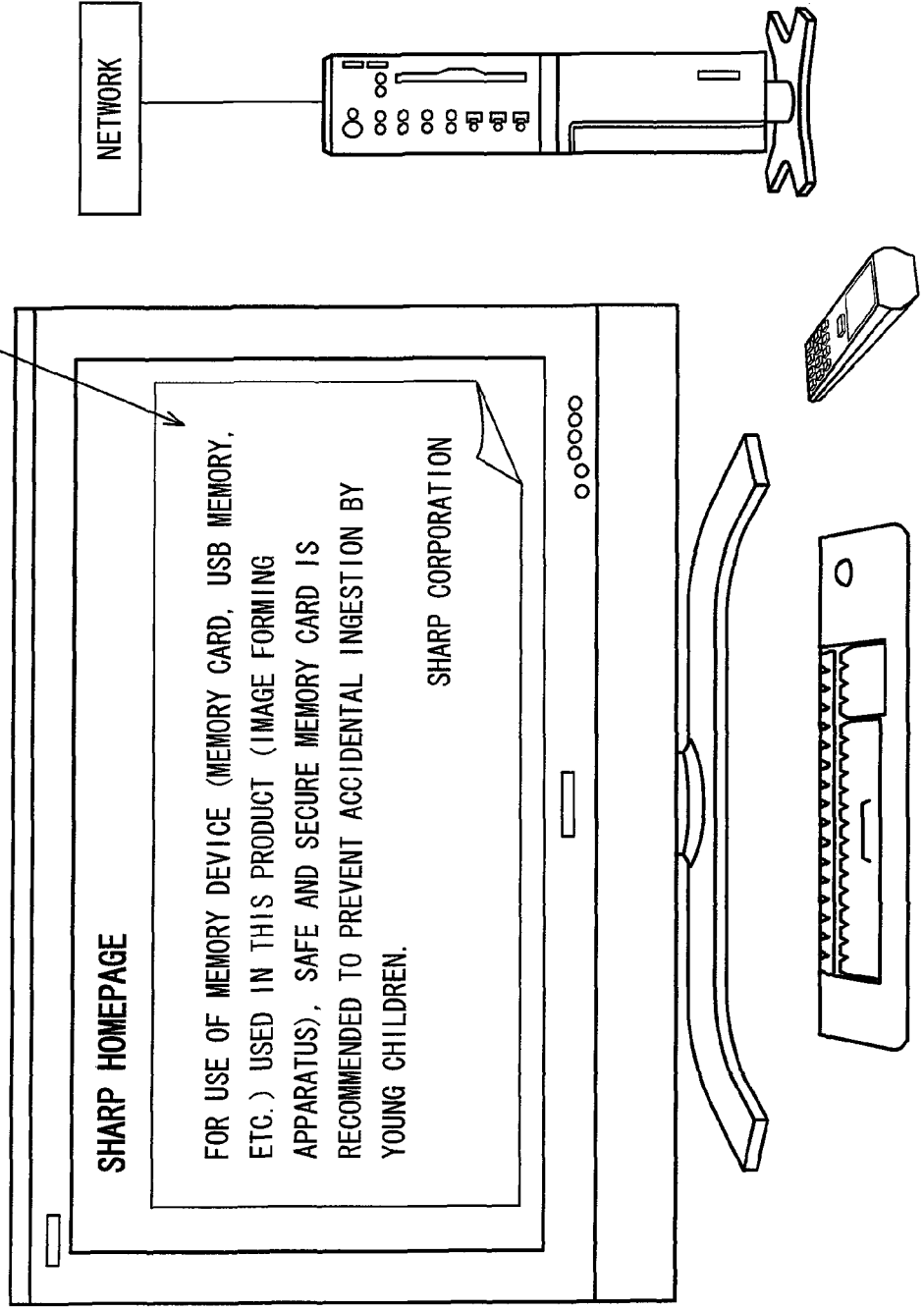
FIG. 18 illustrates another display example of a notification window on a Web page.
Figure 19:
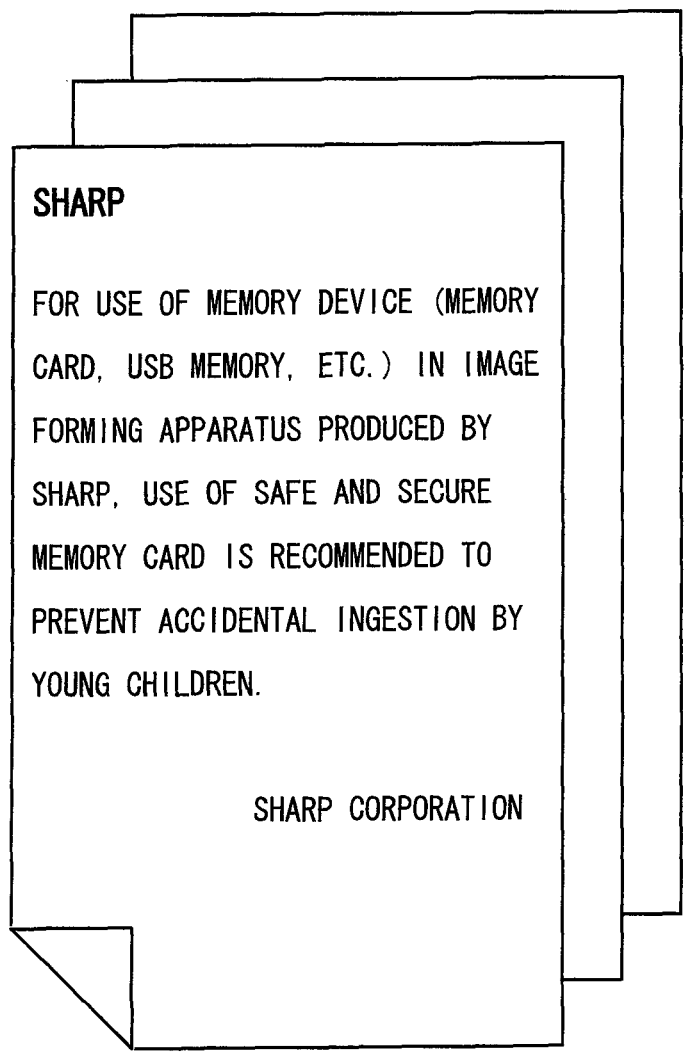

The notification may be performed by other means. For example, a notification window that warns of accidental ingestion of a memory card by young children may be displayed on a Web page (see FIG. 17). Further, a window, on a Web page, which shows a catalogue of the image forming apparatus 100 may contain such a notification window (see FIG. 18). Furthermore, a notification message that warns of accidental ingestion of a memory card by young children may be posted on newspapers, various leaflets, or magazines (see FIG. 19). This notifies users of the existence of recommendable memory devices.

The arrangement of the image forming apparatus 100 is not limited to the arrangement illustrated in FIG. 1. The image forming apparatus 100 may be arranged as a compact printer or multifunction printer for domestic use.

Embodiment 2

In Embodiment 1, the notification window is always displayed at a timing when a memory card is inserted in the memory reading section 99. However, the present invention is not limited to this. For example, the notification window may be displayed except for a case where an inserted memory card is supposedly a recommendable memory device.

Another embodiment of the present invention is described below with reference to FIG. 20 and FIG. 21. For convenience of explanation, members having the same functions as those in the drawings explained in Embodiment have the same reference signs as those explained in Embodiment 1, and therefore are not explained here.

Figure 20:
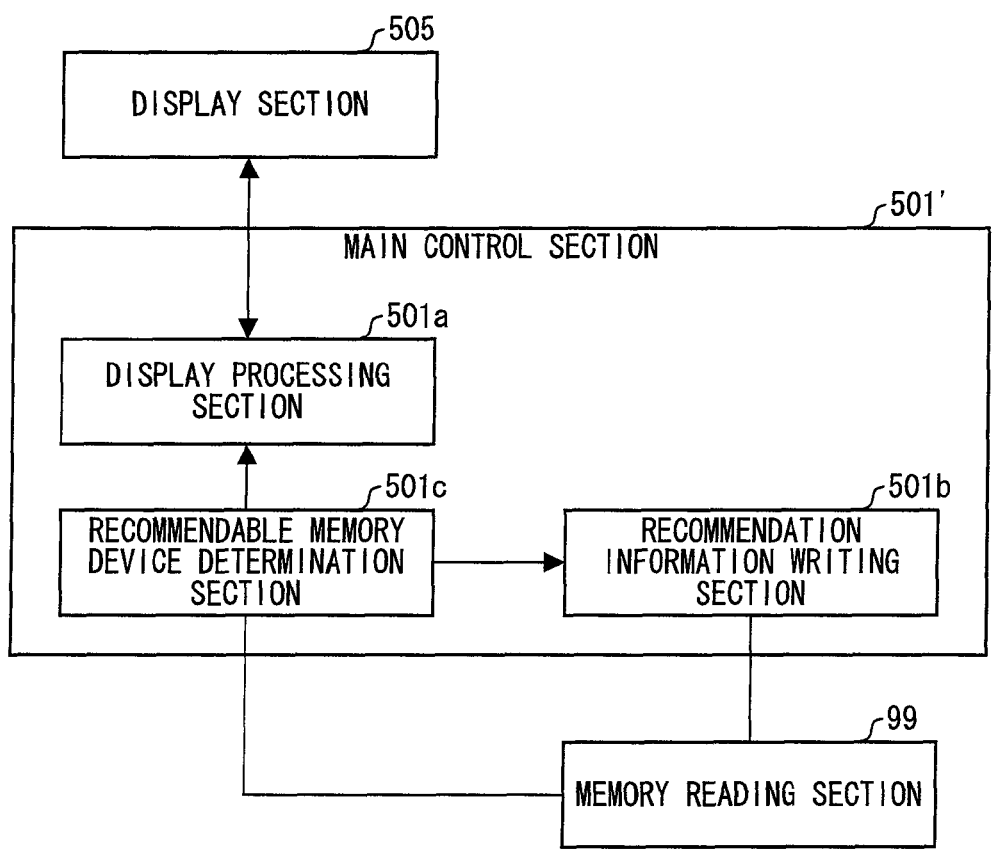
FIG. 20 is a block diagram illustrating an arrangement of a main control section of an image forming apparatus according to Embodiment 2 of the present invention.

FIG. 20 is a block diagram illustrating an arrangement of a main control section 501' in the present embodiment. As illustrated in FIG. 20, the main control section 501' of the present embodiment is different from the main control section 501 of Embodiment 1 in that the main control section 501' includes a recommendable memory device determination section 501c and a recommendation information writing section 501b.

Further, a display processing section 501a in the present embodiment is different from the display processing section 501a of Embodiment 1 in that only when receiving (a) an insertion detection signal from a memory reading section and (b) a process execution instruction from the recommendable memory device determination section 501c, the display processing section 501a causes a display section 505 to display a notification window that warns of accidental ingestion of a memory card by young children.

The recommendation information writing section 501b is a section for performing a writing process of writing, in a memory card inserted in the memory reading section 99, recommendation information indicative of whether the memory card is a recommendable memory device or not. The recommendation information writing section 501b executes the writing process when receiving a process execution instruction from the recommendable memory device determination section 501c.

More specifically, the recommendation information writing section 501b carries out the following process, as the wiring process. Initially, the recommendation information writing section 501b causes the display section 505 to display a window that urges a user to enter information on whether a memory card currently inserted is a recommendable memory device or not. The recommendation information writing section 501b then creates recommendation information in accordance with the entered information, and writes the recommendation information in the memory card. That is, in a case where the entered information indicates that the inserted memory card is a recommendable memory device, the recommendation information writing section 501b creates recommendation information indicative of a recommendable memory device. On the other hand, in a case where the entered information indicates that the inserted memory card is not a recommendable memory device, the recommendation information writing section 501b creates recommendation information indicative of not a recommendable memory device.

The recommendable memory device determination section 501c is a section for determining whether or not the memory card inserted in the memory reading section 99 is a recommendable memory device. More specifically, in a case where recommendation information is recorded in a memory card inserted in the memory reading section 99 and the recommendation information is indicative of a recommendable memory device, the recommendable memory device determination section 501c determines that the inserted memory card is a recommendable memory device. Meanwhile, in a case where recommendation information is recorded in a memory card inserted in the memory reading section 99 and the recommendation information is indicative of not a recommendable memory device, the recommendable memory device determination section 501c determines that the inserted memory card is not a recommendable memory device. Further, in a case where no recommendation information is recorded in a memory card inserted in the memory reading section 99, the recommendable memory device determination section 501*c* determines that it is uncertain whether the inserted memory card is a recommendable memory device or not.

In a case where it is determined that the inserted memory card is not a recommendable memory device, the recommendable memory device determination section 501*c* sends a process execution instruction to the display processing section 501*a*.

Further, in a case where it is determined that the inserted memory card is a recommendable memory device, the recommendable memory device determination section 501*c* sends no instruction to execute a display process of displaying the notification window, to the display processing section 501*a*. Accordingly, no notification window is displayed.

Further, in a case where the recommendable memory device determination section 501*c* determines that it is uncertain whether the inserted memory card is a recommendable memory device or not, the recommendable memory device determination section 501*c* sends process execution instructions to the display processing section 501*a* and the recommendation information writing section 501*b*.

Figure 21:
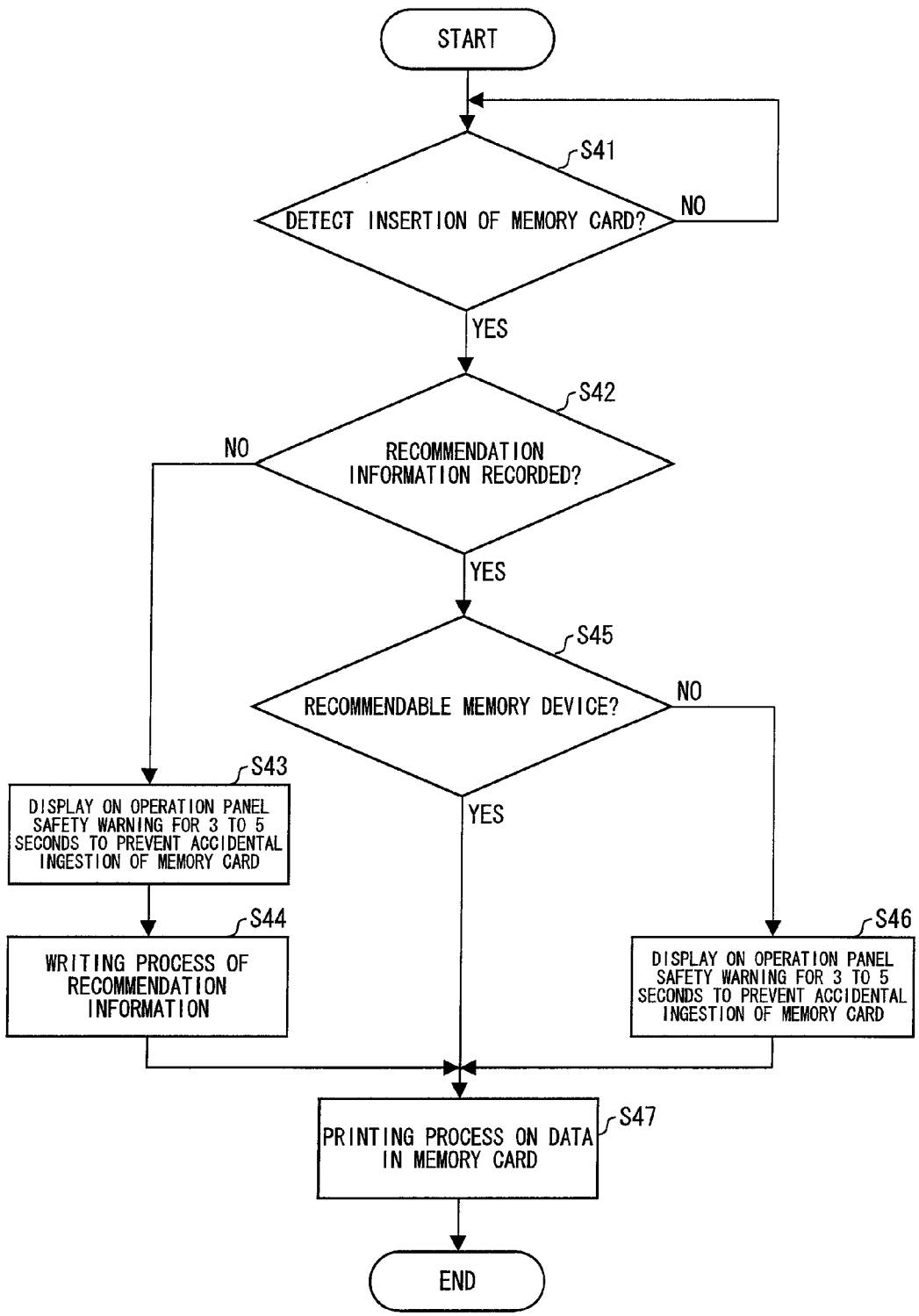
FIG. 21 is a flowchart illustrating a flow of a process performed when a memory card is inserted into the image forming apparatus according to Embodiment 2.

The following describes a flow of the process of the present embodiment, with reference to FIG. 21. FIG. 21 is a flowchart illustrating a process flow in accordance with the present embodiment.

Initially, the main control section 501' determines whether or not a memory card is inserted into the memory reading section 99 (S41). More specifically, in a case where the main control section 501' receives an insertion detection signal from the memory reading section 99, the main control section 501' determines that a memory card is inserted in the memory reading section 99.

In a case where a memory card is inserted in the memory reading section 99, the recommendable memory device determination section 501*c* determines whether or not recommendation information is recorded in the inserted memory card (S42).

In a case where no recommendation information is recorded in the memory card (No in S42), the recommendable memory device determination section 501*c* sends process execution instructions to the display processing section 501*a* and the recommendation information writing section 501*b*. In response to the instruction, the display processing section 501*a* causes the display section 505 to display a notification window that warns of accidental ingestion of the memory card by young children (S43). Subsequently, the recommendation information writing section 501*b* causes the display section 505 to display a window that urges a user to enter information indicative of whether the currently inserted memory card is a recommendable memory device or not. Then, the recommendation information writing section 501*b* creates recommendation information in accordance with the entered information, and writes the recommendation information in the memory card (S44). After that, the process proceeds to S47.

On the other hand, in a case where recommendation information is recorded in the memory card (Yes in S42), the recommendable memory device determination section 501*c* determines whether or not the recommendation information is indicative of a recommendable memory device (S45).

In a case where the recommendation information is indicative of not a recommendable memory device (No in S45), the recommendable memory device determination section 501*c* sends a process execution instruction to the display processing section 501*a*. In response to the process execution instruction, the display processing section 501*a* causes the display section 505 to display a notification window that warns of accidental ingestion of the memory card by young children (S46). Subsequently, the process proceeds to S47.

On the other hand, in a case where the recommendation information is indicative of a recommendable memory device (Yes in S45), the process proceeds to S47.

Finally, the main control section 501' performs the same process as the process of S3 illustrated in FIG. 4 (S47). That is, the main control section 501' executes a printing process in accordance with a user input.

According to the present embodiment, in a case where a user uses a recommendable memory device, the notification window is not displayed. With the arrangement, for a user who has already used a recommendable memory device, the notification window is not undesirably displayed, whereby the user can start a printing process immediately.

Finally, the blocks of the image forming apparatus 100 and the computer apparatus 200, especially, the main control sections 501, 501', the installation-completion checking section 206, and the notification window display control section 207 may be realized by way of hardware or software as executed by a CPU as follows:

The image forming apparatus 100 and the computer apparatus 200 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the image forming apparatus 100 and the computer apparatus 200 a computer-readable storage medium containing control program code (executable program, intermediate code program, or source program) for the image forming apparatus 100 and the computer apparatus 200, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

Further, the image forming apparatus 100 and the computer apparatus 200 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network.

As described above, an image forming apparatus of the present invention is an image forming apparatus into which a memory device is insertable and which performs a printing process on an image of image data stored in the memory device. The image forming apparatus of the present invention includes: a detection section for detecting insertion of the memory device into the image forming apparatus; and a notification section for performing a notification process of warning of accidental ingestion of the memory device, when the detection section detects the insertion of the memory device.

Further, a control method of the present invention for controlling an image forming apparatus is a control method for controlling an image forming apparatus into which a memory device is insertable and which performs a printing process on an image of image data stored in the memory device, and includes the steps of (a) checking whether or not the memory device is inserted into the image forming apparatus; and (b) performing a notification process of warning of accidental ingestion of the memory device, when the insertion of the memory device is detected.

In the above arrangement, when a memory device is inserted, a notification process of warning of accidental ingestion of the memory device is performed. With the above arrangement, a user can be notified of a possibility that accidental ingestion of the memory device by young children may happen. This causes the user to give attention to the accidental ingestion. As a result, it is possible to prevent the accidental ingestion.

It is preferable that the image forming apparatus of the present invention include a display section, so that when the detection section detects the insertion of the memory device, the notification section causes the display section to display a notification window that warns of accidental ingestion of the memory device. With the above arrangement, a user can visually check the notification window.

The image forming apparatus of the present invention preferably includes a recommendation information writing section for writing, into the inserted memory device, recommendation information indicative of whether or not the memory device is a recommendable memory device, on which a treatment for preventing the accidental ingestion is performed, the recommendation information writing section writing the recommendation information in accordance with a user input, and the image forming apparatus of the present invention is preferably arranged such that in a case where the recommendation information is recorded in the inserted memory device and the recommendation information indicates that the inserted memory device is a recommendable memory device, the notification section omits the notification process.

In the above arrangement, in a case where recommendation information is recorded in an inserted memory device and the recommendation information indicates that the inserted memory device is a recommendable memory device, the notification process is omitted. Therefore, no warning is notified to a user who has already used a recommendable memory device. That is, unnecessary notification can be skipped. Further, the user who has already used a recommendable memory device never receives the notification, and can perform a next operation immediately.

Further, the image forming apparatus of the present invention is preferably arranged such that the notification section performs, as the notification process, notification that encourages use of a recommendable memory device, on which a treatment for preventing the accidental ingestion is performed.

With the arrangement, even if a user who does not know the existence of recommendable memory devices, it is possible to notify the user of the existence of recommendable memory devices. As a result, it is possible to promote prevention of the accidental ingestion.

Further, An image forming system of the present invention includes: the image forming apparatus; and an information processing apparatus which establishes communication with the image forming apparatus, and is arranged such that the image forming apparatus has a function of performing a printing process on an image of image data received from the information processing apparatus, and when the detection section detects insertion of a memory device, the information processing apparatus performs a notification process of warning a user of accidental ingestion of the memory device.

In the above arrangement, when a memory device is inserted, not only the image forming apparatus but also the information processing apparatus perform notification that warns of accidental ingestion of the memory device. With the arrangement, the user can further be notified of a possibility that accidental ingestion of the memory device by young children may happen. This causes the user to give attention to the accidental ingestion. As a result, it is possible to prevent the accidental ingestion.

Further, a program of the present invention is a program for causing a computer to operate, in which computer a printer driver for operating the image forming apparatus is to be installed, and the program of the present invention causes the computer to function as (a) an installation-completion checking section for checking whether installation of the printer driver is completed or not, and (b) a display control section for controlling a display device to display a notification window that warns of accidental ingestion of a memory card, when the installation-completion checking section detects the completion of the installation of the printer driver. A computer-readable storage medium in which the program is stored is also included in the scope of the present invention.

In the above arrangement, when a printer driver is installed, notification that warns a user of accidental ingestion of a memory device is performed. This causes the user to give attention to accidental ingestion before using the image forming apparatus.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to image forming apparatuses, such as a printer and a multifunction printer, into which a memory device is insertable.

REFERENCE SIGNS LIST

99 Memory Reading Section (Detection Section)
100 Image Forming Apparatus
200 Computer Apparatus (Information Processing Apparatus)
201 Display Section (Display Device)
205 Installation Processing Section
206 Installation-completion Checking Section
207 Notification Window Display Control Section (Display Control Section)
501, 501' Main Control Section
501a Display Processing Section (Notification Section)
501b Recommendation Information Writing Section 501c Recommendable Memory Device Determination Section
502 Memory Section
505 Display Section

The invention claimed is:

1. An image forming apparatus into which a memory device is insertable and which performs a printing process on an image of image data stored in the memory device, said image forming apparatus comprising:
   a detection section for detecting insertion of the memory device into the image forming apparatus;
   a notification section for performing a notification process of warning of accidental ingestion of the memory device, when the detection section detects the insertion of the memory device; and
   a recommendation information writing section for writing, into the inserted memory device, recommendation information indicative of whether or not the memory device is a recommendable memory device, on which a treatment for preventing the accidental ingestion is performed, the recommendation information writing section writing the recommendation information in accordance with a user input, and
   in a case where the recommendation information is recorded in the inserted memory device and the recommendation information indicates that the inserted memory device is a recommendable memory device, the notification section omitting the notification process.

2. The image forming apparatus as set forth in claim 1, further comprising a display section, wherein:
   when the detection section detects the insertion of the memory device, the notification section causes the display section to display a notification window that warns of accidental ingestion of the memory device.

3. An image forming system comprising:
   an image forming apparatus as set forth in claim 1; and
   an information processing apparatus which establishes communication with the image forming apparatus,
   the image forming apparatus having a function of performing a printing process on an image of image data received from the information processing apparatus,
   when the detection section detects insertion of a memory device, the information processing apparatus performing a notification process of warning a user of accidental ingestion of the memory device.

4. A control method for controlling a computer in which a printer driver for operating an image forming apparatus as set forth in claim 1 is to be installed, said control method comprising the steps of:
   (a) performing an installation-completion checking process of checking whether installation of the printer driver is completed or not; and
   (b) performing a display control process of controlling a display device to display a notification window that warns of accidental ingestion of a memory card, when the completion of the installation of the printer driver is detected.

5. A computer-readable storage medium in which a program for causing a computer to operate, in which computer a printer driver for operating an image forming apparatus as set forth in claim 1 is to be installed, the program causing the computer to function as (a) a installation-completion checking section for checking whether installation of the printer driver is completed or not, and (b) a display control section for controlling a display device to display a notification window that warns of accidental ingestion of a memory card, when the installation-completion checking section detects the completion of the installation of the printer driver.

6. A control method for controlling an image forming apparatus into which a memory device is insertable and which performs a printing process on an image of image data stored in the memory device, said control method comprising the steps of:
   (a) checking whether or not the memory device is inserted into the image forming apparatus;
   (b) performing a notification process of warning of accidental ingestion of the memory device, when the insertion of the memory device is detected; and
   (c) writing, into the inserted memory device, recommendation information indicative of whether or not the memory device is a recommendable memory device, on which a treatment for preventing the accidental ingestion is performed, the writing of the recommendation information being in accordance with a user input, and
   (d) in a case where the recommendation information is recorded in the inserted memory device and the recommendation information indicates that the inserted memory device is a recommendable memory device, the notification process being omitted.

* * * * *